(12) United States Patent
Eyring et al.

(10) Patent No.: US 11,281,240 B1
(45) Date of Patent: *Mar. 22, 2022

(54) RESOURCE CONSUMPTION MEASUREMENT SYSTEM AND METHOD

(71) Applicant: Orbit Irrigation Products, LLC, North Salt Lake, UT (US)

(72) Inventors: Stuart Eyring, Bountiful, UT (US); Karl L. Connolly, Bountiful, UT (US); Bradly Williams, Buffalo, WY (US); Eric Tres Wangsgaard, Salt Lake City, UT (US); Brad Wardle, Kaysville, UT (US)

(73) Assignee: Orbit Irrigation Products, LLC, North Salt Lake, UT (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/685,804

(22) Filed: Nov. 15, 2019

Related U.S. Application Data

(63) Continuation of application No. 15/621,947, filed on Jun. 13, 2017, now Pat. No. 10,534,378, which is a
(Continued)

(51) Int. Cl.
*G06Q 10/06* (2012.01)
*G05B 13/02* (2006.01)
(Continued)

(52) U.S. Cl.
CPC ......... *G05D 7/0676* (2013.01); *G01F 13/006* (2013.01); *G05B 15/02* (2013.01)

(58) Field of Classification Search
CPC .................................................. G05B 15/02
(Continued)

(56) References Cited

U.S. PATENT DOCUMENTS

| 5,381,669 A | 1/1995 | Bahel |
| 6,695,046 B1 | 2/2004 | Byrnes |

(Continued)

FOREIGN PATENT DOCUMENTS

| EP | 2427862 | 3/2012 |
| WO | 2005076093 | 8/2005 |
| WO | 2010129913 | 11/2010 |

OTHER PUBLICATIONS

Aquacue Inc., note19.com Blog post, web page [online] [retrieved on Dec. 7, 2015], published May 21, 2010, Retrieved from the Internet: <URL: https://note19.wordpress.com/category/aquacue-barnacle/> (shown in attachment 1) (see, e.g., the Archive for the Aquacue Barnacle' Category section).

(Continued)

*Primary Examiner* — Md Azad
(74) *Attorney, Agent, or Firm* — Austin Rapp

(57) ABSTRACT

A system, method, and device may be used to provide irrigation water consumption data. The system may include an irrigation valve interface and controller that communicates with irrigation valves to open and close the valves. An identification module identifies one or more time periods when water consumption is not likely to occur or is likely minimal and a calibration module opens and closes the irrigation valves according to calibration schedule data. A timestamp module may identify a calibration valve open time and a calibration valve close time for the irrigation valves and a computational module may calculate a computed flow rate for the irrigation valves based on the calibration valve open time, the calibration valve close time, and the actual water usage data that occurred between the calibration valve open time and the calibration valve close time. The computed flow rate may be utilized to identify anomalies and provide notifications thereof.

20 Claims, 21 Drawing Sheets

Related U.S. Application Data continuation of application No. 14/949,739, filed on Nov. 23, 2015, now Pat. No. 9,684,312.

(60) Provisional application No. 62/113,362, filed on Feb. 6, 2015, provisional application No. 62/083,171, filed on Nov. 22, 2014.

(51) Int. Cl.
*G05B 13/04* (2006.01)
*G06N 3/04* (2006.01)
*G06Q 50/06* (2012.01)
*G05D 7/06* (2006.01)
*G05B 15/02* (2006.01)
*G01F 13/00* (2006.01)

(58) Field of Classification Search
USPC ..................................................... 700/284
See application file for complete search history.

(56) References Cited

U.S. PATENT DOCUMENTS

| | | | |
|---|---|---|---|
| 6,791,088 B1 | 9/2004 | Williams | |
| 6,851,621 B1 | 2/2005 | Wacker | |
| 7,234,313 B2 | 6/2007 | Bell | |
| 7,412,876 B2 | 8/2008 | Kates | |
| 8,417,391 B1 | 4/2013 | Rombouts | |
| 8,498,729 B2 | 7/2013 | Popp | |
| 8,548,635 B2 | 10/2013 | Watson | |
| 8,588,983 B2 | 11/2013 | Grabinger | |
| 8,602,743 B2 | 12/2013 | Stiles | |
| 8,618,941 B2 | 12/2013 | Javey | |
| 8,749,182 B2 | 6/2014 | Grabinger | |
| 8,798,796 B2 | 8/2014 | Grohman | |
| 8,802,981 B2 | 8/2014 | Wallaert | |
| 9,131,642 B2 * | 9/2015 | Groeneveld | A01G 25/16 |
| 9,684,312 B1 | 6/2017 | Eyring | |
| 9,749,792 B2 * | 8/2017 | Klicpera | G01F 15/066 |
| 9,939,297 B1 | 4/2018 | Eyring | |
| 10,534,378 B1 | 1/2020 | Eyring | |
| 2005/0107924 A1 * | 5/2005 | Bailey | A01G 25/16 |
| | | | 700/284 |
| 2009/0271045 A1 * | 10/2009 | Savelle, Jr. | A01G 25/167 |
| | | | 700/284 |
| 2010/0030389 A1 | 2/2010 | Palmer | |
| 2010/0289652 A1 * | 11/2010 | Javey | H04Q 9/00 |
| | | | 340/605 |
| 2011/0093123 A1 * | 4/2011 | Alexanian | A01G 25/16 |
| | | | 700/284 |
| 2012/0239211 A1 * | 9/2012 | Walker | A01G 25/16 |
| | | | 700/284 |
| 2013/0061615 A1 | 3/2013 | Omer | |
| 2014/0236868 A1 * | 8/2014 | Cook | A01G 25/16 |
| | | | 705/412 |
| 2014/0245208 A1 | 8/2014 | Javey | |
| 2014/0262130 A1 | 9/2014 | Yenni | |
| 2015/0045971 A1 | 2/2015 | Endel | |
| 2015/0319941 A1 | 11/2015 | Klein | |
| 2015/0362207 A1 | 12/2015 | Abiprojo | |
| 2016/0037736 A1 | 2/2016 | Rainone | |

OTHER PUBLICATIONS

Stanford University, Real-Time Water Use Monitoring Fact Sheet, web page [online] [retrieved on Dec. 7, 2015], apparently published in February of 2013, Retrieved from the Internet: <URL https://suwater.stanford.edu/sites/g/files/sbiybj7756/f/sem_barnacle_fact_sheet.pdf> (shown in attachment 2).

City of Palo Alto, Real-Time Water Use Monitoring: An Effective Tool for Water Management, Conference presentation, apparently presented on Oct. 3, 2013. (shown in attachment 3).

Badger Meter, Inc., Beacon Advanced Metering Analytics, web page [online] [retrieved on Dec. 7, 2015], apparently published in Sep. 2014, Retrieved from the Internet: <URL https://www.badgermeter.com/resources/a4dc33f5-0d23-414f-8acb-eOd25f107a98/beacon%20advanced%20metering%20analytics%20brochure%20bea-br-00556-en.pdf/> (shown in attachment 4).

Badger Meter, Inc., Orion Migratable, web page [online] [retrieved on Dec. 7, 2015], apparently published in November of 2015, Retrieved from the Internet: <URL https://www.badgermeter.com/resources/743f04b7-c494-47ff-ac49-832e6a263d48/orion migrateable me fhss mobile transceiver application data ori-as-01052-en.pdf/> (shown in attachment 5).

Badger Meter, Inc., Beacon Advanced Metering Analytics Mobile Solution, Product Data Sheet [online] [ retrieved on Dec. 7, 2015], apparently published in November of 2015, Retrieved from the Internet: <URL: https://www.badgermeter.com/resources/ccec1792-1c70-4197-b857-cbd1b8f6a4c2/beacon%20advanced%20metering%20analytics%20mobile%20solution%20product%20d ata%20sheet%20bea-ds-01912-en.pdf/> (shown in attachment 6).

Aquacue Inc., Barnacle Water Meter, web page [online] [retrieved on Dec. 7, 2015], published at least by Dec. 4, 2015, Retrieved from the Internet: <URL: http://barnaclewatermeter.weebly.com/> (shown in attachment 7).

Badger Meter, Inc., Beacon Advanced Metering Analytics, web page [online] [retrieved on Dec. 9, 2015], published at least by Dec. 4, 2015, Retrieved from the Internet: <URL: https://www.badgermeter.com/brands/beacon> (shown in attachment 8).

Office Action, U.S. Appl. No. 14/949,739, dated Sep. 2, 2016 (shown in attachment 9).

Office Action Response, U.S. Appl. No. 14/949,739, dated Dec. 2, 2016 (shown in attachment 10).

Notice of Allowance and Fee(s) Due (including a Notice of Allowability section, a Detailed Action section, an Information Disclosure Statement section, an Examiner's Amendment section, an Allowable Subject Matter section, and an Examiner's Statement of Reason for Allowance section), U.S. Appl. No. 14/949,739, dated Jan. 20, 2017 (shown in attachment 11).

Amendment After Allowance, U.S. Appl. No. 14/949,739, dated Apr. 20, 2017 (shown in attachment 12).

Issue Fee Payment, U.S. Appl. No. 14/949,739, dated Apr. 20, 2017 (shown in attachment 13).

Notice of Allowance and Fee(s) Due (including a Notice of Allowability section, a Detailed Action section, an Information Disclosure Statement section, an Examiner's Amendment section, an Amendments to the Specification section, an Amendments to the Claims section, an Allowable Subject Matter section and an Examiner's Statement of Reason for Allowance section), U.S. Appl. No. 15/009,390, dated Nov. 29, 2017 (shown in attachment 14).

Issue Notification, U.S. Appl. No. 15/009,390, dated Mar. 21, 2018 (shown in attachment 15).

Notice of Allowance and Fee(s) Due (including a Notice of Allowability section, an Allowable Subject Matter section and an Examiner's Statement of Reason for Allowance section), U.S. Appl. No. 15/621,947, dated Jul. 17, 2019 (shown in attachment 16).

Office Action Response, U.S. Appl. No. 15/621,947, dated May 13, 2019 (shown in attachment 17).

Applicant Initiated Interview, U.S. Appl. No. 15/621,947, dated Apr. 12, 2019 (shown in attachment 18).

Office Action, U.S. Appl. No. 15/621,947, dated Jan. 11, 2019 (shown in attachment 19).

\* cited by examiner

RESOURCE CONSUMPTION MEASUREMENT SYSTEM AND METHOD

CROSS-REFERENCE TO RELATED APPLICATIONS

This application claims priority to and is a continuation application of U.S. application Ser. No. 15/621,947, which was filed on Jun. 13, 2017, and is entitled RESOURCE CONSUMPTION MEASUREMENT SYSTEM AND METHOD, which claims priority to and is a continuation of U.S. application Ser. No. 14/949,739 (issued as U.S. Pat. No. 9,684,312), which was filed on Nov. 23, 2015, and is entitled RESOURCE CONSUMPTION MEASUREMENT SYSTEM AND METHOD, which claims priority to Provisional Patent Application No. 62/083,171, which was filed on Nov. 22, 2014, and entitled WATER CONSUMPTION MEASUREMENT SYSTEM AND METHOD, and to Provisional Patent Application No. 62/113,362, which was filed on Feb. 6, 2015, and entitled WATER CONSUMPTION MEASUREMENT SYSTEM AND METHOD.

The foregoing document(s) are incorporated by reference as though set forth herein in their entirety.

TECHNICAL FIELD

The present disclosure generally relates to resource consumption measurement. More specifically, the present disclosure relates to systems and methods for calculating consumption of resources, such as water, natural gas, electricity, and the like.

BACKGROUND

The growing populations in many metropolitan areas have led to increasing strain on municipal water supply systems. In many areas, the cost of municipal water and other resources has increased. In some cases, usage of higher amounts of water and other resources leads to higher per-unit charges. Accordingly, it would be advantageous to provide improved systems and methods for monitoring resource consumption.

SUMMARY

Embodiments of the disclosed subject matter are provided below only for illustrative purposes and are in no way limiting of the claimed subject matter.

In various embodiments, an irrigation flow controller may obtain irrigation water consumption data pertinent to a water-monitored property. The irrigation flow controller may include an irrigation valve interface that allows the irrigation flow controller to electronically communicate with one or more irrigation valves. The irrigation flow controller may also include an irrigation valve controller that may transmit electrical signals to the one or more irrigation valves to open and close the one or more irrigation valves in accordance with watering schedule data. The irrigation flow controller may also include an identification module that may identify one or more time periods when water consumption is not likely to occur or is likely minimal within the water-monitored property. The irrigation flow controller may further include a calibration module that may open and close the irrigation valves in accordance with calibration schedule data during a first period of time within the one or more time periods when water consumption is not likely to occur or is likely minimal within the water-monitored property. The irrigation flow controller may additionally include a timestamp module that may identify a calibration valve open time and a calibration valve close time for the irrigation valves in accordance with the calibration schedule data during the first period of time. The irrigation flow controller may also include a computational module that may calculate a first computed flow rate for the irrigation valves based on the calibration valve open time, the calibration valve close time, and the actual water usage data that occurred between the calibration valve open time and the calibration valve close time during the first period of time.

In various embodiments, a method for obtaining irrigation water consumption data pertinent to a water-monitored property may include receiving a first actual water usage data, identifying one or more time periods in the first actual water usage data when water consumption is not likely to occur or is likely minimal within the water-monitored property, and opening and closing the irrigation valves in accordance with calibration schedule data during a first period of time within the one or more time periods when water consumption is not likely to occur or is likely minimal within the water-monitored property. The method may also include identifying a calibration valve open time and a calibration valve close time for the irrigation valves in accordance with the calibration schedule data during the first period of time. The method may further include receiving a second actual water usage data that occurred between the calibration valve open time and the calibration valve close time for the irrigation valves during the first period of time, and calculating a first computed flow rate for the irrigation valves based on the calibration valve open time, the calibration valve close time, and the second actual water usage data that occurred between the calibration valve open time and the calibration valve close time during the first period of time.

In various embodiments, a computer program product for obtaining irrigation water consumption data pertinent to a water-monitored property may include a non-transitory computer readable medium and computer program code, encoded on the non-transitory computer readable medium, configured to cause at least one processor to perform the steps of: receiving a first actual water usage data, identifying one or more time periods in the first actual water usage data when water consumption is not likely to occur or is likely minimal within the water-monitored property, and opening and closing the irrigation valves in accordance with calibration schedule data during a first period of time within the one or more time periods when water consumption is not likely to occur or is likely minimal within the water-monitored property. The computer program product may also include the steps of identifying a calibration valve open time and a calibration valve close time for the irrigation valves in accordance with the calibration schedule data during the first period of time. The computer program product may further include the steps of receiving a second actual water usage data that occurred between the calibration valve open time and the calibration valve close time for the irrigation valves during the first period of time, and calculating a first computed flow rate for the irrigation valves based on the calibration valve open time, the calibration valve close time, and the second actual water usage data that occurred between the calibration valve open time and the calibration valve close time during the first period of time.

In various embodiments, a pulse capturing device may capture the pulses and determine the amount of water passing through the water meter. Timestamps may be associated with each generated pulse to determine a time or an estimated time that the pulse was transmitted or received. The pulses and/or timestamps may be referred to as water meter flow data.

An irrigation sprinkler controller may access or generate irrigation water flow data. The irrigation water flow data may indicate a start and a stop time for operation of an associated sprinkler system. Sprinkler systems often consume a large portion of the water used by a business or a residence. Accordingly, in various embodiments, the water meter flow data may be used to determine the amount of water passing through the water meter during operation of the sprinkler system (i.e., pulses having a timestamp within the period of operation of the sprinkler system may be attributed to the use of water for irrigation purposes). Thus, the irrigation water flow data used together with the water meter flow data may be utilized to determine irrigation water consumption data, which indicates or provides an estimate of the amount of water consumed by an associated sprinkler system or other irrigation system, and non-irrigation water consumption data, which provides an estimate of the amount of water consumed for non-irrigation purposes. The non-irrigation water consumption data may be ascertained by determining the number of pulses generated when the sprinkler system is not operating.

Alternatively, total water consumption may be determined based on the total number of pulses within a period of time (e.g., a month), and the irrigation water consumption data may be used to determine estimated irrigation water consumption. In particular, the estimated irrigation water consumption may be subtracted from total water consumption to determine the estimated non-irrigation water consumption. Conversely, the estimated non-irrigation water consumption could be subtracted from the total water consumption to determine the estimated irrigation water consumption.

While non-irrigation water could be consumed during operation of the sprinkler system, sprinkler systems often operate late at night or early in the morning when little, if any, water is used for non-irrigation purposes. Further, the amount of water consumed for non-irrigation purposes is often quite small in comparison to the amount of water use for irrigation purposes. Accordingly, in some embodiments, it is submitted that the irrigation water consumption data provides a reasonable estimate of water used for irrigation purposes and the non-irrigation water consumption data provides a reasonable estimate of water used for non-irrigation purposes.

In various embodiments, research usage, such as water and energy usage, may be estimated by calibrating water valves, gas valves, and/or electrical switches to provide a computed flow rate for each water valve, gas valve, and/or electrical switch of interest. The total estimated water and/or energy usage may then be calculated by multiplying the total operation time of the water valve, gas valve, and/or electrical switch by its unique computed flow rate to get an estimated water or energy consumption value.

The foregoing systems, methods, and computer program products may be performed by various devices, including network communication devices, processors, sprinkler controllers, HVAC controller, servers, mobile phones, and/or other computing devices.

It should again be noted that the above summary provides only examples of the subject matter within the scope of this disclosure.

BRIEF DESCRIPTION OF THE DRAWINGS

Exemplary embodiments of the present disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the present disclosure will be described with additional specificity and detail through use of the accompanying drawings in which:

Figure 1:
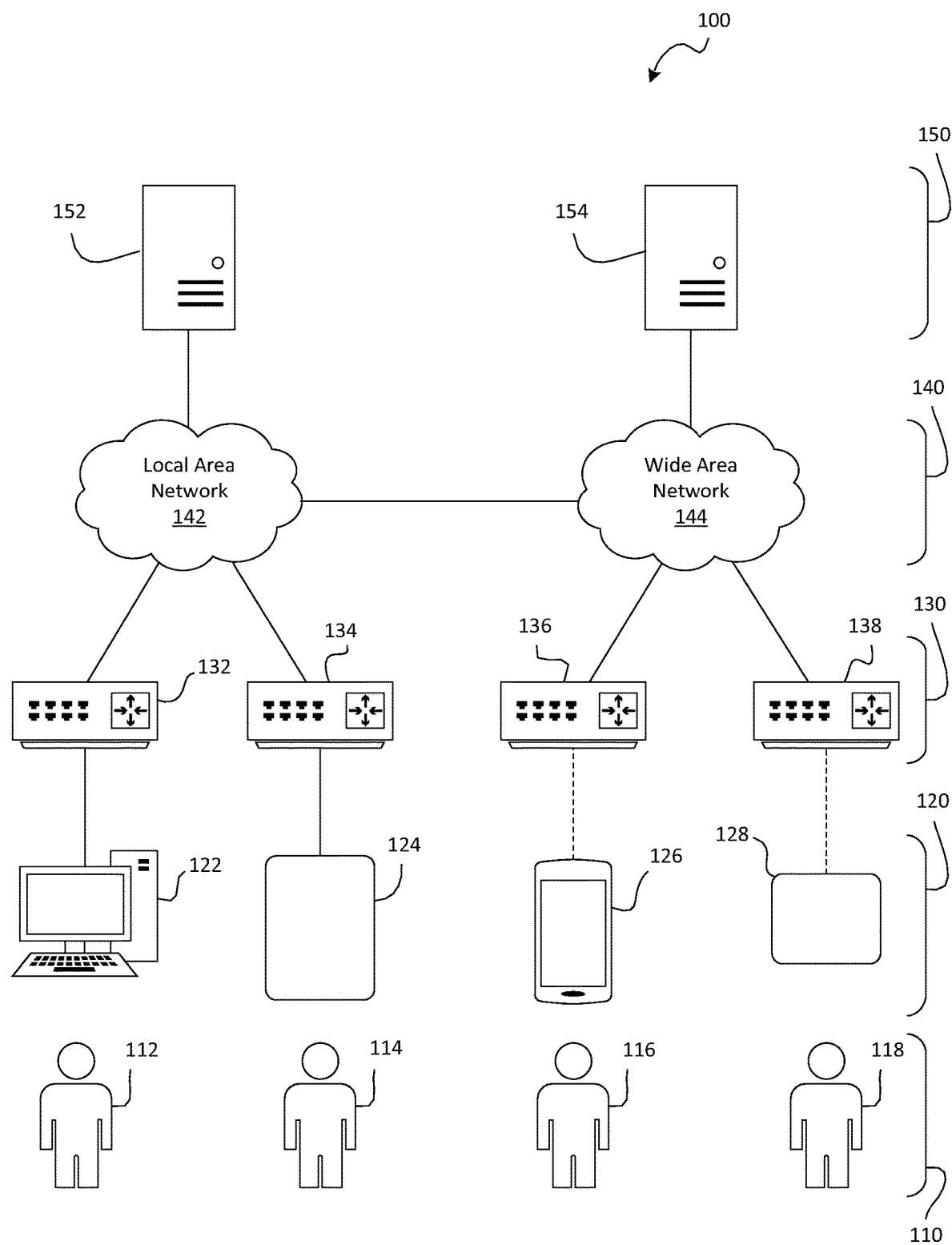
FIG. 1 is a schematic block diagram illustrating one embodiment of a system for measuring water consumption and performing other functions.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (i.e., a device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific mechanism, function, or both disclosed herein is merely representative. Based on the teachings herein, one skilled in the art should appreciate that an aspect disclosed herein may be implemented independently of any other aspects and that two or more of these aspects may be combined in various ways, even if not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using mechanisms or functionality known to one of skill in the art at the time this application was filed, although not specifically disclosed within the application.

In addition, such an apparatus may be implemented, or such a method may be practiced, using mechanisms or functionality disclosed elsewhere in the application and/or using mechanisms and functionality known to one of skill in the art at the time of filing this application and which is not set forth herein.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

Referring to FIG. 1, a schematic block diagram illustrates one embodiment of a system 100 for measuring water consumption and performing other functions. The system 100 may be used for the benefit of one or more users 110, which may include a first user 112, a second user 114, a third user 116, and a fourth user 118, as shown in FIG. 1. (The number of users 110 who may employ or use the system 100 may be varied within the scope of the disclosed subject matter. The four users 112, 114, 116, 118 identified in FIG. 1 are provided only as an example of one potential implementation.) Each of the users 110 may use one of a variety of computing devices 120, which may include any of a wide variety of devices that carry out computational steps, including but not limited to a desktop computer 122 used by the first user 112, a pulse detecting device 124 coupled or positioned adjacent to a water meter 310 (illustrated in FIG. 3) used by the second user 114, a smartphone 126 used by the third user 116, a multi-zone irrigation flow controller 128 used by the fourth user 118, and the like. The systems and methods presented herein may be carried out on any type of computing device 120 and may be used by a single user 110 or multiple different users 110.

The computing devices 120 may optionally be connected to each other and/or other resources. Such connections may be wired or wireless, and may be implemented through the use of any known wired or wireless communication standard, including but not limited to Ethernet, 802.11a, 802.11b, 802.11g, and 802.11n, universal serial bus (USB), Bluetooth, cellular, near-field communications (NFC), Bluetooth Smart, ZigBee, Z-Wave, and the like. In FIG. 1, by way of example, wired communications are shown with solid lines and wireless communications are shown with dashed lines.

Communications between the various elements of FIG. 1 may be routed and/or otherwise facilitated through the use of routers 130. The routers 130 may be of any type known in the art, and may be designed for wired and/or wireless communications through any known communications standard including, but not limited to, those listed above. The routers 130 may include, for example, a first router 132 that facilitates communications to and/or from the desktop computer 122, a second router 134 that facilitates communications to and/or from the pulse detecting device 124, a third router 136 that facilitates communications to and/or from the smartphone 126, and a fourth router 138 that facilitates communications to and/or from the multi-zone irrigation flow controller 128. Alternatively, a single router (e.g., the first router 132) could process the communications.

The routers 130 may facilitate communications between the computing devices 120 and one or more networks 140, which may include any type of network, including, but not limited to, local area networks (such as a local area network 142) and/or wide area networks (such as a wide area network 144) or a combination of local and wide area networks 140. In one example, the local area network 142 may be a network 140 that services an entity such as a business, non-profit entity, government organization, or the like. The wide area network 144 may provide communications for multiple entities and/or individuals, and in some embodiments, may comprise the Internet. The local area network 142 may communicate with the wide area network 144. If desired, one or more routers 130 or other devices may be used to facilitate such communication.

The networks 140 may store information on servers 150 or other information storage devices. As shown, a first server 152 may be connected to the local area network 142, and may thus communicate with devices 120 connected to the local area network 142, such as the desktop computer 122 and the pulse detecting device 124. A second server 154 may be connected to the wide area network 144 and may thus communicate with devices 120 connected to the wide area network 144, such as the smartphone 126 and the multi-zone irrigation flow controller 128. If desired, the second server 154 may be a web server that provides web pages, web-connected services, executable code designed to operate over the Internet, and/or other functionality that facilitates the provision of information and/or services over the wide area network 144.

Figure 2A:
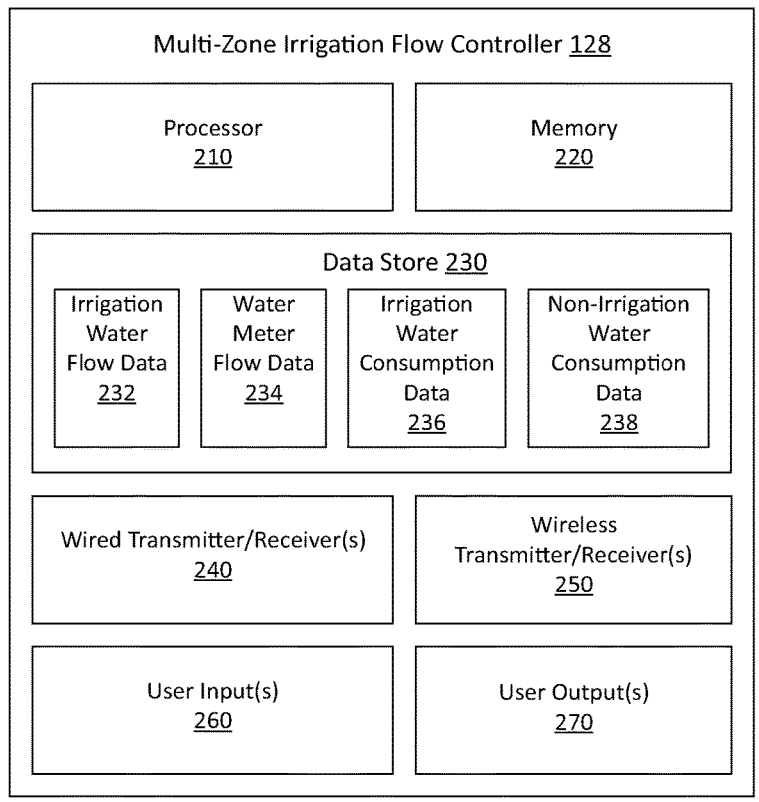
FIG. 2A is a schematic block diagram illustrating one embodiment of a computing device in the form of an irrigation flow controller, which is capable of practicing at least one embodiment of the present disclosure in a stand-alone computing environment.

Referring to FIG. 2A, a schematic block diagram illustrates one embodiment of a computing device 128 (which comprises one example of the computing devices 120 illustrated in FIG. 1) that enables implementation of embodiments of the present disclosure in a standalone computing environment. The computing device 128 may be, for example, the multi-zone irrigation flow controller 128 of FIG. 1. Alternatively, the computing device may comprise a single-zone irrigation flow controller (shown in FIG. 3).

As shown, the multi-zone irrigation flow controller 128 may include a processor 210 that is designed to execute instructions. The processor 210 may be of any of a wide variety of types, including microprocessors with x86-based architecture or other architecture known in the art, application-specific integrated circuits (ASICs), field-programmable gate arrays (FPGA's), and the like. The processor 210 may optionally include multiple processing elements, or "cores." The processor 210 may include a cache that provides temporary storage of data incident to the operation of the processor 210.

The multi-zone irrigation flow controller 128 may further include memory 220, which may be volatile memory (such as random access memory (RAM)). The memory 220 may include one or more memory modules. The memory 220 may include executable instructions, data referenced by such executable instructions, and/or any other data that may beneficially be made readily accessible to the processor 210.

The multi-zone irrigation flow controller 128 may further include a data store 230, which may comprise non-volatile or volatile memory (such as a hard drive, flash memory, and/or the like). The data store 230 may include one or more data storage elements. The data store 230 may store executable code (such as an operating system and/or various programs) to be run on the multi-zone irrigation flow controller 128, which may also be referred to herein as "multi-zone irrigation flow controller(s)," "irrigation flow controller(s)," and/or "flow controller(s)." The data store 230 may further store data to be used by such programs. For the systems and methods of the present disclosure, the data store 230 may store, for example, irrigation water flow data 232, water meter flow data 234, irrigation water consumption data 236 and non-irrigation water consumption data 238.

The irrigation water flow data 232 may include data regarding irrigation activities managed, for example, by the multi-zone irrigation flow controller 128 of FIG. 1, by a hose-attached irrigation flow controller (sometimes referred to as a "hose tap timer"), or by any other type of irrigation flow controller. The irrigation water flow data 232 may include all of the data needed to determine the amount of water used for irrigation, which may include, but need not be limited to, irrigation start times, irrigation stop times, irrigation durations, flow rates, total irrigation water flow over a period of time, water pressure information, irrigation pipe sizes, sprinkler head information, and/or the like. The irrigation water flow data 232 may include zone-specific information pertaining to individual irrigation zones and/or global information pertaining to all zones controlled by the multi-zone irrigation flow controller 128. The irrigation water flow data 232 may be specific to the irrigation activities carried out in association with or on a water-monitored property. The water-monitored property may or may not include a structure (not shown), such as a home, a commercial building, an industrial facility, and/or the like. As indicated previously, the irrigation water flow data 232 may include start and stop times for individual watering zones or a start and stop time for an entire group of watering zones. (Watering zones may also be referred to as watering stations.) The start and stop times may include the specific time, day, and/or date.

The water meter flow data 234 may include data regarding water flow monitored, for example, by the pulse detecting device 124 of FIG. 1. The water meter flow data 234 may also have timestamps indicating the time the pulse was generated or received or an estimate thereof. The pulse detecting device 124 may be integral, or coupled to, or adjacent to a water meter 310 (illustrated in FIG. 3) that meters water flow to the water-monitored property. The water meter flow data 234 may include all of the water used on or in connection with a water-monitored property (which may include or be associated with a structure), and may therefore include water for irrigation and non-irrigation purposes. The water meter flow data 234 may include, but need not be limited to, water consumption start times, stop times, and/or durations, water flow rates, and/or the like.

The irrigation water consumption data 236 may include data regarding irrigation water used in connection with a water-monitored property. The irrigation water may comprise, for example, water used for irrigating or watering any type of plant (e.g., grass, shrubbery, flowers, crops, gardens or trees), whether positioned inside or outside of a climate-controlled structure. The non-irrigation water consumption data 238, in various embodiments, relates to all water consumption aside from irrigation water, such as water used for cooking, bathing, drinking (for both human and animal consumption). The irrigation water consumption data 236 may be ascertained by multiplying the total number of pulses received during the period of irrigation according to the irrigation water flow data 232 by the amount of water associated with each pulse, for example, during a period or periods of irrigation. In some embodiments, the non-irrigation water consumption data 238 may be obtained by subtracting the total water consumed according to the irrigation water flow data 232 from the water amount consumed according to the water meter flow data 234. The total amount of water consumed may be ascertained by multiplying the total number of pulses received during the pertinent period by the amount of water associated with each pulse. In one embodiment, irrigation water flow data 232 may be calculated based on an estimated flow rate for an irrigation valve (e.g., 15 gallons per minute) multiplied by the number of minutes that the irrigation valve is open (i.e., the period of time that the zone of the water-monitored property is being irrigated). (Each zone of the water monitored property may receive irrigation water through a single irrigation valve period) The estimated flow rate for an irrigation zone may be calculated, for example, using a flow meter for a particular zone or for the water-monitored property (during a period when other water usage is negligible or absent) or may be estimated as described below in connection with, for example, FIG. 8.

In various embodiments, the non-irrigation water consumption data 238 may be ascertained by multiplying the total number of pulses received during non-irrigation periods by the amount of water represented by each pulse. The irrigation water consumption data 236 may then be ascertained by subtracting the amount of water associated with the non-irrigation water consumption data 238 from the total water consumed according to the water meter flow data 234 during a period of time involving both a period of irrigation and a period of non-irrigation. The foregoing procedure may be based on the presumption that the non-irrigation water consumed during a period of irrigation is sufficiently small to be considered negligible. This presumption is valid in a wide range of use-case scenarios. In various alternative embodiments, the irrigation water flow data 232 for a particular period may be subtracted from the water meter flow data 234 to ascertain non-irrigation water consumption data 238. Again, the irrigation water flow data 232 may be calculated using various mechanisms or techniques, as explained previously.

The multi-zone irrigation flow controller 128 may further include one or more wired transmitter/receivers 240, which may facilitate wired communications between the multi-zone irrigation flow controller 128 and any other device (such as other computing devices 120, the servers 150, and/or the routers 130 of FIG. 1). The wired transmitter/receivers 240 may communicate via any known wired protocol, including, but not limited to, any of the wired protocols described in connection with FIG. 1. In some embodiments, the wired transmitter/receivers 240 may include Ethernet adapters, universal serial bus (USB) adapters, and/or the like.

The multi-zone irrigation flow controller 128 may further include one or more wireless transmitter/receivers 250, which may facilitate wireless communications between the multi-zone irrigation flow controller 128 and any other device (such as the other computing devices 120, the servers 150, and/or the routers 130 of FIG. 1). The wireless transmitter/receivers 250 may communicate via any known wireless protocol, including, but not limited to, any of the wireless protocols referenced in connection with FIG. 1. In some embodiments, the wireless transmitter/receivers 250 may include Wi-Fi adapters, ZigBee adapters, Z-Wave adapters, Bluetooth adapters, cellular adapters, and/or the like.

The multi-zone irrigation flow controller 128 may further include one or more user inputs 260 that receive input from a user such as the fourth user 118 of FIG. 1. The user inputs 260 may be integrated into the multi-zone irrigation flow controller 128, or may be separate from the multi-zone irrigation flow controller 128 and connected to it by a wired or wireless connection, which may operate via the wired transmitter/receivers 240 and/or the wireless transmitter/receivers 250. The user inputs 260 may include elements such as touch screens, buttons, keyboards, mice, track balls, track pads, styli, digitizers, digital cameras, microphones, and/or other user input devices known in the art.

The multi-zone irrigation flow controller 128 may further include one or more user outputs 270 that provide output to a user, such as the fourth user 118 of FIG. 1. The user outputs 270 may be integrated into the multi-zone irrigation flow controller 128, or may be separate from the multi-zone irrigation flow controller 128 and connected to it by a wired or wireless connection, which may operate via the wired transmitter/receivers 240 and/or the wireless transmitter/receivers 250. The user outputs 270 may include elements such as a display screen, speaker, vibration device, LED or other lights, and/or other output devices known in the art. In some embodiments, one or more of the user inputs 260 may be combined with one or more of the user outputs 270, as may be the case with a touch screen.

The multi-zone irrigation flow controller 128 may include various other components not shown or described herein. Those of skill in the art will recognize, with the aid of the present disclosure, that any such components may be used to carry out embodiments of the present disclosure, in addition to or in the alternative to the components shown and described in connection with FIG. 2A.

The multi-zone irrigation flow controller 128 may be capable of carrying out embodiments of the present disclosure in a standalone computing environment (i.e., without relying on communication with or through other devices such as the other computing devices 120 or the servers 150). Other embodiments of the present disclosure may be utilized in different computing environments. One example of a client/server environment is shown and described in connection with FIG. 2B.

Figure 2B:
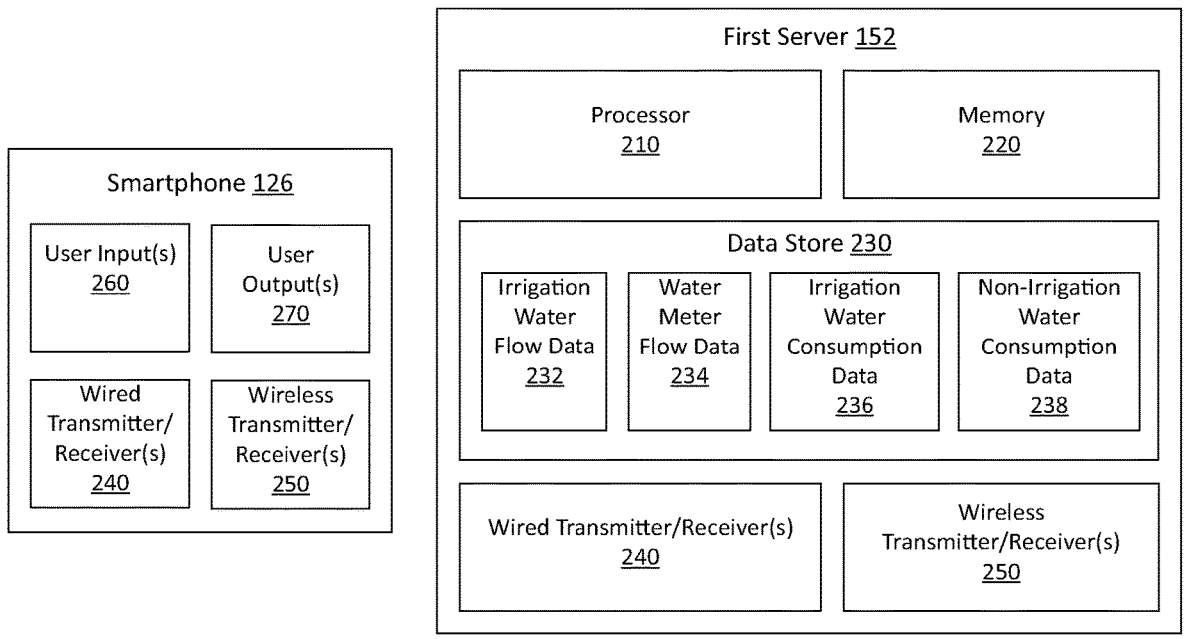
FIG. 2B is a schematic block diagram illustrating embodiments of computing devices in the form of a smartphone and a server, which may cooperate to enable practice of embodiments of the present disclosure with client/server architecture.

Referring to FIG. 2B, a schematic block diagram illustrates embodiments of a computing device (in the form of the smartphone 126 of FIG. 1), and a server (in the form of the first server 152 of FIG. 1), which may cooperate to enable practice of embodiments of the present disclosure with client/server architecture. As shown, the smartphone 126 may function as a "dumb terminal," that is, it is made to function in conjunction with the first server 152.

Thus, the smartphone 126 may have and/or use only the hardware needed to interface with a user (such as the first user 112 of FIG. 1) and communicate with the first server 152. Thus, the smartphone 126 may include one or more user inputs 260, one or more user outputs 270, one or more wired transmitter/receivers 240, and/or one or more wireless transmitter/receivers 250. These components may be as described above in connection with FIG. 2A.

Computing functions (apart from those incident to receiving input from the user 110 and delivering output to the user 110) may be carried out, in various embodiments, by the first server 152. Thus, the processor 210, memory 220, data store 230, wired transmitter/receivers 240 and wireless transmitter/receivers 250 may be housed in the first server 152.

In various embodiments, the smartphone 126 may receive input from the user 110 via the user inputs 260. The user input may be delivered to the first server 152 via the wired transmitter/receivers 240 and/or wireless transmitter/receivers 250. This user input may be further conveyed by any intervening devices, such as the first router 132 and any other devices in the local area network 142 that are needed to convey the user input from the first router 132 to the first server 152.

The first server 152 may conduct any processing steps needed in response to receipt of the user input. Then, the first server 152 may transmit user output to the user 110 via the wired transmitter/receivers 240, and/or wireless transmitter/receivers 250. This user output may be further conveyed by any intervening devices, such as the first router 132 and any other devices in the local area network 142 that are needed to convey the user output from the first server 152 to the first router 132. The user output may then be provided to the user 110 via the user outputs 270 on the smartphone 126.

Figure 3:
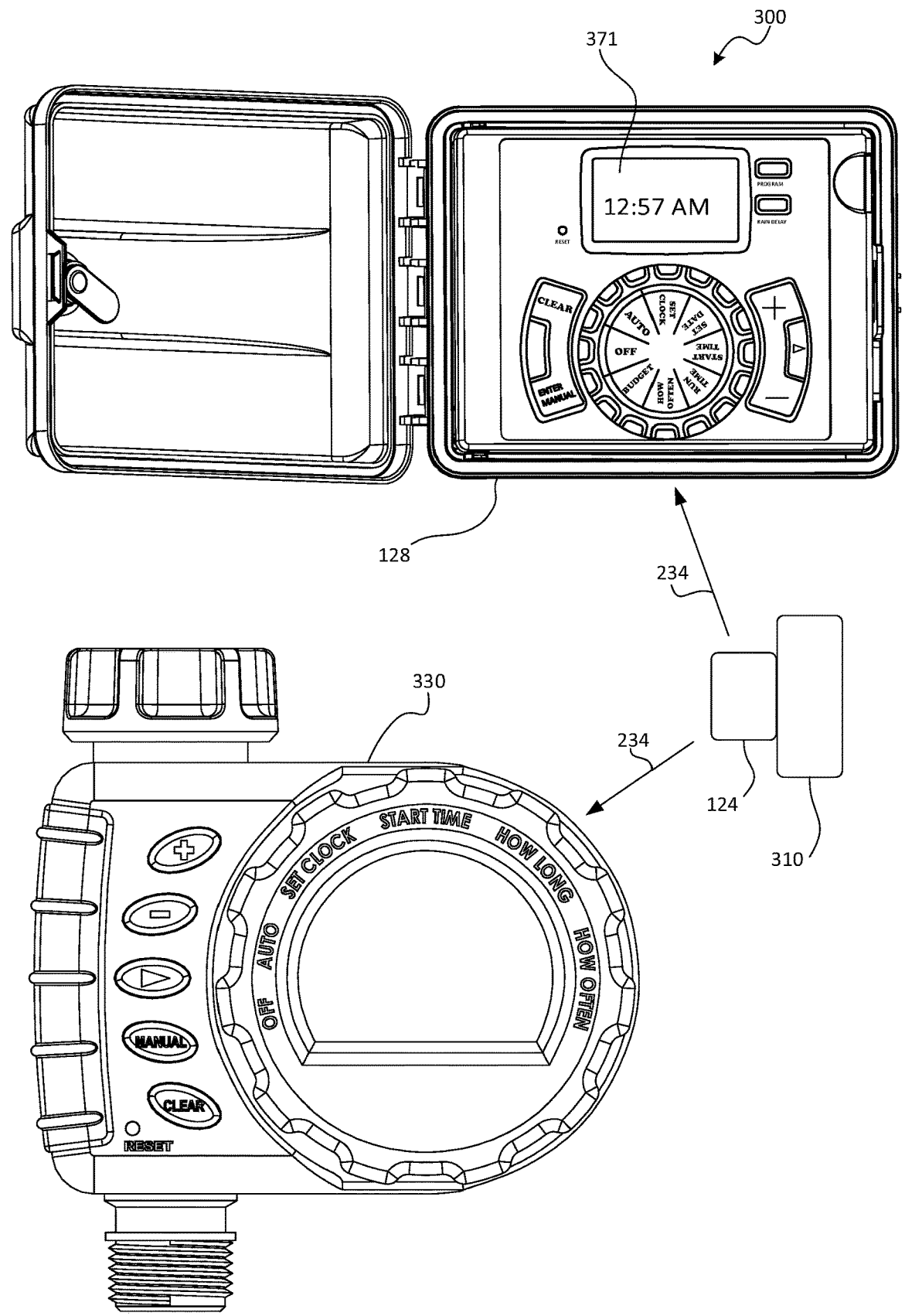
FIG. 3 is a schematic block diagram illustrating one embodiment of a system for measuring water flow.

Referring to FIG. 3, a schematic block diagram illustrates one embodiment of a system 300 for measuring water flow. The system 300 represents one example of operation of the present disclosure in a standalone computing environment, as exemplified by FIG. 2A.

As shown, the pulse detecting device 124 may be connected to a water meter 310. Alternatively, the pulse detecting device 124 may merely be adjacent to or in close proximity to the water meter 310. The water meter 310 may be a municipal water meter of any known type and may measure the water consumed at a water-monitored property (including irrigation and non-irrigation water consumption). The pulse detecting device 124 may deliver the water meter flow data 234 to the multi-zone irrigation flow controller 128. The water meter flow data 234 may be transmitted wirelessly and/or over a wired connection, as described previously.

The multi-zone irrigation flow controller 128 may generate the irrigation water flow data 232 and perform the necessary calculations on the irrigation water flow data 232 and the water meter flow data 234 to obtain the irrigation water consumption data 236. The multi-zone irrigation flow controller 128 may have a display screen 371 that displays the irrigation water consumption data 236, non-irrigation water consumption data 238, and/or other data, such as the irrigation water flow data 232 and/or the water meter flow data 234, for the user.

If desired, the multi-zone irrigation flow controller 128 may provide categorized and quantified water use data (such as irrigation water consumption data 236 and non-irrigation water consumption data 238) for the user 110. This may make it easy for the user 110 to determine how much water the water-monitored property (for example, his or her home) is consuming for various activities. This information may optionally be displayed graphically, with breakdowns for different water consumption activities, different dates and/or times of day, different water flow rates, and/or the like.

The pulse detecting device 124 may additionally or alternatively provide the water meter flow data 234 to a hose-attached irrigation flow controller 330, which may be connected to a hose and/or hose bib to control irrigation in a single zone. The hose-attached irrigation flow controller 330 may generate irrigation water flow data 232 in a manner similar to that of the multi-zone irrigation flow controller 128. If desired, the hose-attached irrigation flow controller 330 may receive the water meter flow data 234 and perform the necessary calculations on the irrigation water flow data 232 and the water meter flow data 234 to obtain the irrigation water consumption data 236 and non-irrigation water consumption data 238.

The hose-attached irrigation flow controller 330 and multi-zone irrigation flow controller 128 illustrated in FIG. 3 comprise non-limiting examples and serve only to illustrate the type of device or devices that may be used to perform the functions identified herein.

Figure 4:
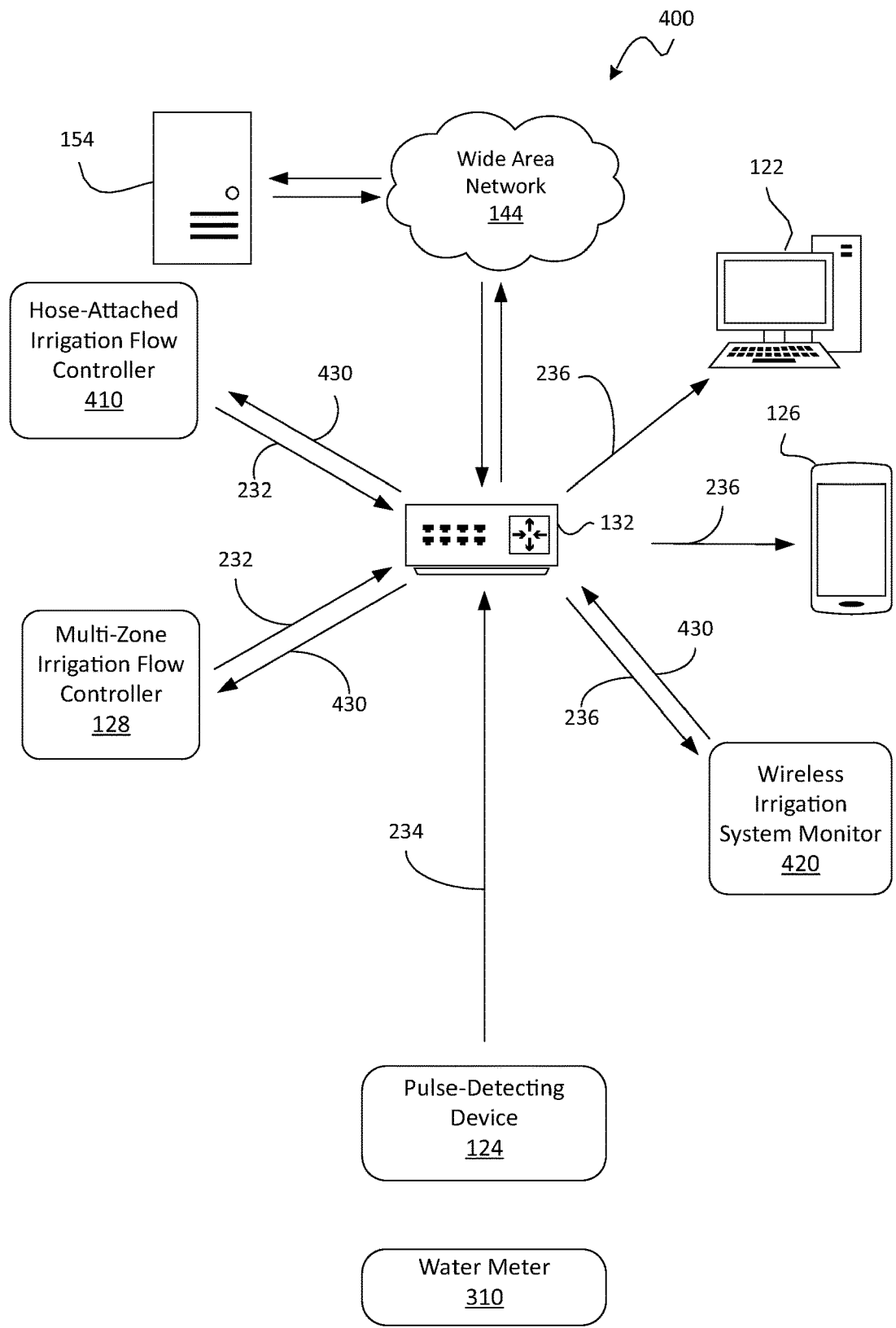
FIG. 4 is a schematic block diagram illustrating one embodiment of a system for measuring water consumption and performing other functions.

Referring to FIG. 4, a schematic block diagram illustrates one embodiment of a system 400 for measuring water consumption and performing other functions. The system 400 represents one example of operation in a client/server computing environment, as also exemplified in FIG. 2B. As shown, the pulse detecting device 124 may deliver the water meter flow data 234 to a router, such as the first router 132 of FIG. 1. Similarly, the multi-zone irrigation flow controller 128 may also deliver the irrigation water flow data 232 to the first router 132.

Further, the system 400 may include one or more additional irrigation flow controllers. For example, the system 400 may also include a hose-attached irrigation flow controller 410, which may be attached to a hose bib and/or hose to control irrigation of one zone via the hose. The hose-attached irrigation flow controller 410 may also transmit irrigation water flow data 232 to the first router 132. (In various embodiments, the multi-zone irrigation flow controller 128 and/or hose-attached irrigation flow controller 410 may each comprise a pulse detecting device 124 to detect pulses generated by the water meter 310.)

From the router 132, the irrigation water flow data 232 and the water meter flow data 234 may be conveyed to the second server 154 over the wide area network 144, which may be the Internet. The second server 154 may be housed in any suitable facility. In various embodiments, the second server 154 may be controlled by the manufacturer of components of the irrigation system used for irrigation of the water-monitored property. Thus, in some embodiments, the second server 154 may be controlled by the manufacturer of the multi-zone irrigation flow controller 128, the hose-attached irrigation flow controller 410, the pulse detecting device 124, and/or a wireless irrigation system monitor 420, which will be described subsequently.

The second server 154 may then perform the necessary calculations to obtain the irrigation water consumption data 236 and/or the non-irrigation water consumption data 238, which may be transmitted back to the first router 132 via the wide area network 144.

The irrigation water consumption data 236 may be conveyed to any of a variety of computing devices by the first router 132. These computing devices may include, but need not be limited to, a desktop computer 122 and a smartphone 126 (examples of which are shown in FIG. 1). Additionally or alternatively, these computing devices may include the wireless irrigation system monitor 420, which may be a dedicated device and/or software that can be used to monitor and/or control the operation of the irrigation flow controller 128 and/or other irrigation system components. The wireless irrigation system monitor 420 may optionally be stored in or near the water-monitored property so that the user 110 of the monitor 420 can easily view his or her water consumption (including, for example, the irrigation water flow data 232 and the irrigation water consumption data 236) and make any necessary adjustments to the operation of the irrigation system based on this information.

Adjustments made via the wireless irrigation system monitor 420 may be transmitted as commands 430 to the first router 132, and thence to the multi-zone irrigation flow controller 128 and/or the hose-attached irrigation flow controller 410, as applicable. The multi-zone irrigation flow controller 128 and/or the hose-attached irrigation flow controller 410 may then make the adjustments needed to carry out the commands 430.

The various arrows in FIG. 4, although shown in solid lines, may represent wired and/or wireless data transmission. According to some embodiments, the first router 132 may have a wired connection to the wide area network 144, and wireless connections to the other components of the system 400, aside from the second server 154. These wireless connections may include one or more of the wireless protocols mentioned previously. According to some embodiments, the first router 132 may communicate with other components of the system 400 via Wi-Fi. According to other embodiments, the first router 132 may communicate with other components of the system 400 via ZigBee, Z-wave and/or the like.

Figure 5:
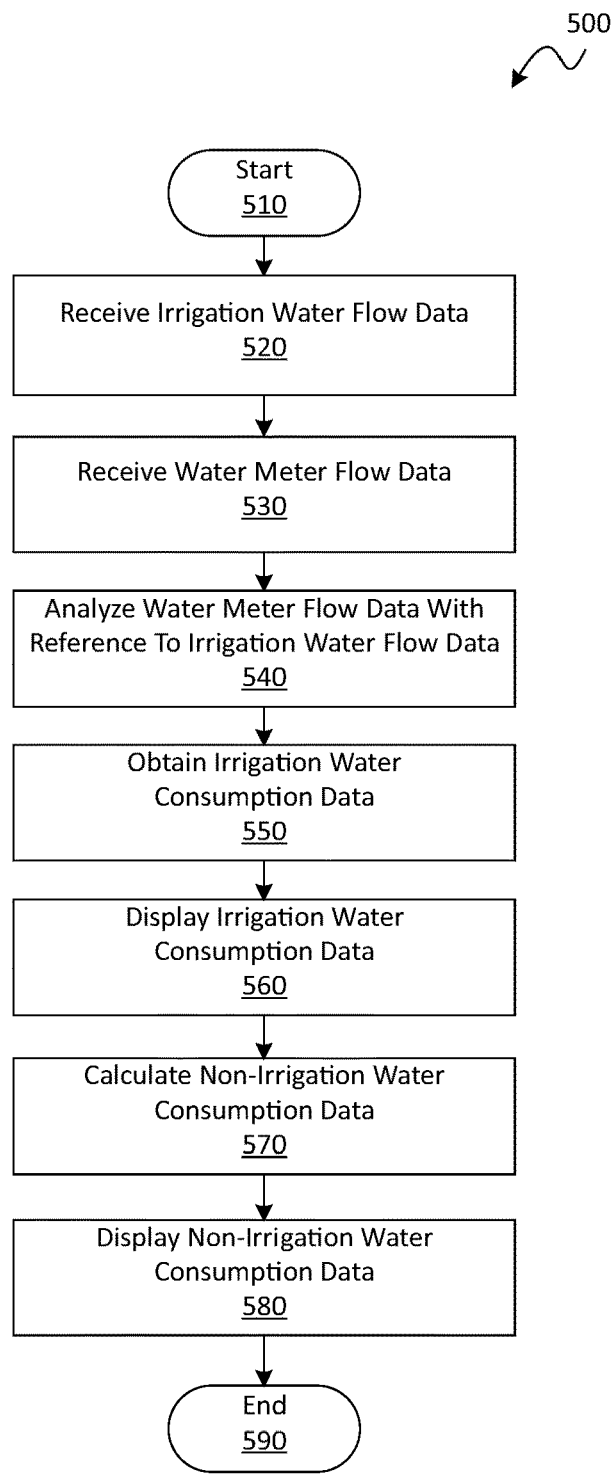
FIG. 5 is a flowchart illustrating one embodiment of a method for measuring water consumption.

Referring to FIG. 5, a flowchart illustrates one embodiment of a method 500 for measuring water consumption. The method 500 may be practiced with, for example, the system 300 of FIG. 3, the system 400 of FIG. 4, or any other system within the scope of the present disclosure. Similarly, the system 300 or the system 400 may operate via the method 500 illustrated in FIG. 5, or via other methods within the scope of the present disclosure.

As shown, the method 500 may start 510 with step 520 in which the irrigation water flow data 232 is received by the processor 210, for example, the processor 210 of the multi-zone irrigation flow controller 128 of FIG. 2A and/or the processor 210 of the first server 152 of FIG. 1. The irrigation water flow data 232 may be received from an irrigation flow controller, such as the multi-zone irrigation flow controller 128 and/or the hose-attached irrigation flow controller 410, as described previously.

In step 530, the water meter flow data 234 may be received by the processor 210. The water meter flow data 234 may be received from a pulse detecting device 124, as described previously.

In step 540, the irrigation water flow data 232 may be analyzed with reference to the water meter flow data 234 by the processor 210. This analysis may entail, for example, determining the number of pulses generated or received within an irrigation watering period or non-irrigation watering period or subtracting the total water consumed during non-irrigation periods based on the non-irrigation water consumption data 238 from the total water consumption based on the water meter flow data 234.

In step 550, the irrigation water consumption data 236 may be obtained. The irrigation water consumption data 236 may be obtained as a direct result of the analysis of the step 540. Alternatively, the irrigation water consumption data 236 may be obtained via performance of one or more additional steps based on the results of the analysis performed in the step 540. For example, the step 540 may entail comparisons of start times, stop times, and/or durations with the timing of pulses received. Additional mathematical steps may be needed to convert the resulting analysis results into the irrigation water consumption data 236.

In step 560, the irrigation water consumption data 236 may be displayed for the user 110. As mentioned previously, this may be done on any of a variety of computing devices, including, but not limited to, the desktop computer 122, the smartphone 126, the irrigation flow controller 128, the hose-attached irrigation flow controller 410, and/or the wireless irrigation system monitor 420. This step may entail displaying any of a wide variety of information, which may include textual and/or graphical forms, and may include a series of graphs (e.g., pie charts or bar graphs) or numerical values broken down by one or more periods of time or the type of water consumption (e.g., irrigation versus non-irrigation watering).

In addition, non-irrigation water consumption data 238 may be calculated in step 570. The non-irrigation water consumption data 238 may be calculated, for example, by subtracting irrigation water consumed according to the irrigation water consumption data 236 for a period from the total water consumed according to the water meter flow data 234 for the period, or by multiplying the number of pulses received during non-irrigation periods by the amount of water associated with each pulse.

Thereafter, the non-irrigation water consumption data 238 may be displayed in step 580 on one or more of various devices described above and the method 500 may terminate 590.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified or various steps may be combined within the scope of the present disclosure.

Figure 6:
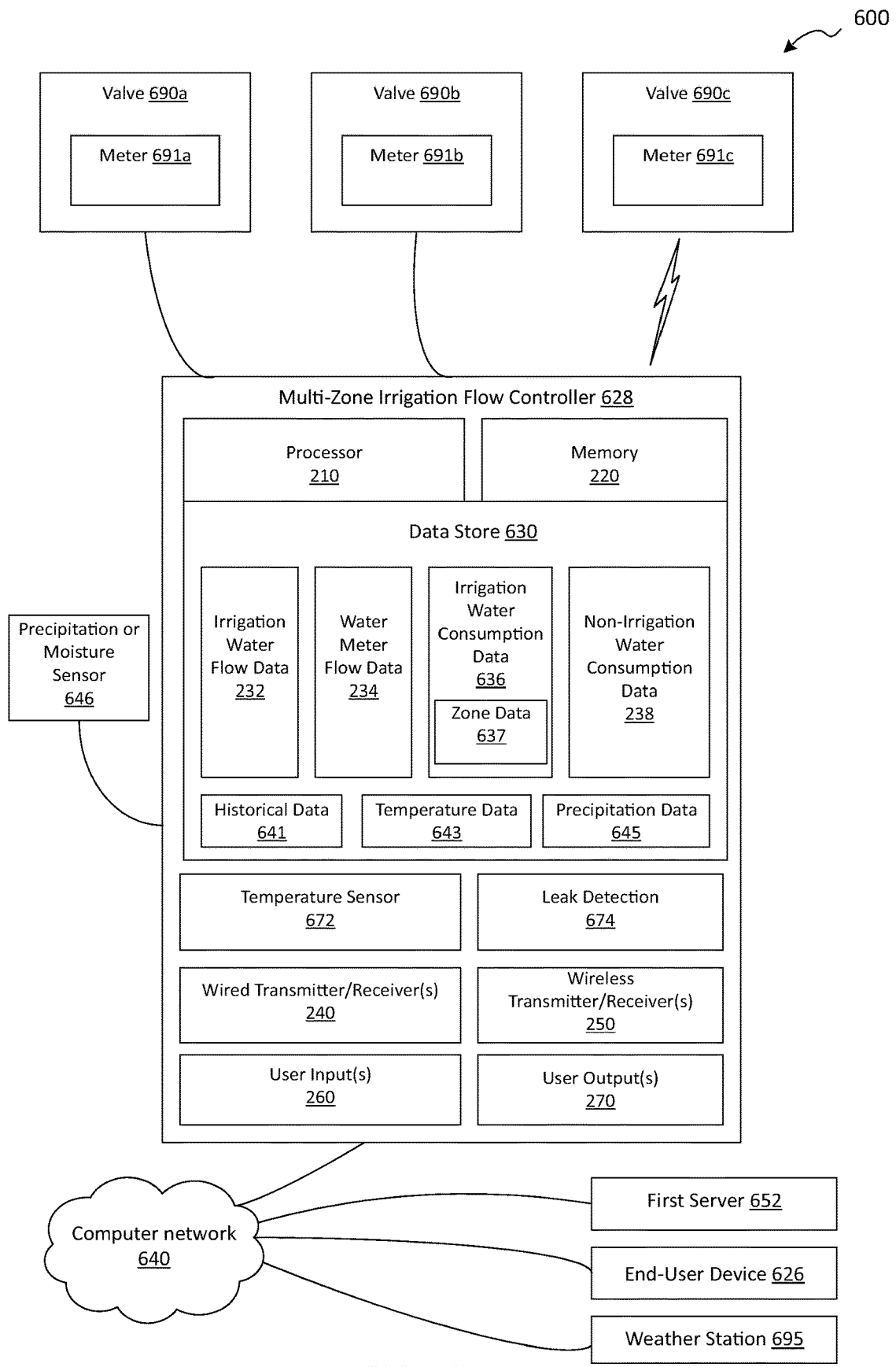
FIG. 6 is a schematic block diagram illustrating one embodiment of a system for measuring water consumption and performing other functions.

FIG. 6 illustrates one embodiment of a system 600 for measuring water consumption and performing other functions. The system 600 may include a series of irrigation valves 690a-c, a multi-zone irrigation flow controller 628, a computer network 640, a weather station 695, a first server 652 and an end-user device 626.

Each of the irrigation valves 690a-c may include an optional meter 691a-c. Each meter 691a-c may monitor the amount of water flowing through each of the valves 690a-c. Water meter flow data 234 may be related to the amount of water flowing through each of the valves 690a-c and may be transmitted wirelessly or via a wired connection to the multi-zone irrigation flow controller 628. The water meter flow data 234 may be in the form of an electronic signal that uniquely identifies each valve 690a-c to which the water meter flow data 234 pertains in order to distinguish the water meter flow data 234 related to each of the valves 690a-c. The meters 691a-c may be positioned in alternative locations throughout the system 600. For example, a single meter 691a-c could pertain to multiple valves 690a-c or all of the valves 690a-c. In various embodiments, one or more of the valves 690a-c could comprise the hose-attached irrigation flow controller 330, 410 shown in FIGS. 3 and 4.

The number of irrigation valves 690a-c and meters 691a-c shown in FIG. 6 is merely illustrative. Accordingly, the number of irrigation valves 690a-c and meters 691a-c may be varied within the scope of the disclosed subject matter or, in certain embodiments, may be entirely omitted from the system 600.

The multi-zone irrigation flow controller 628 may include similar components and functionality included in the multi-zone irrigation flow controller 128 shown in FIG. 2A. Components which are common to both the flow controller 628 of FIG. 6 and the flow controller 128 of FIG. 2A include the same reference numerals and perform generally the same function and, accordingly, will not be described again. Components shown in FIG. 6 that are analogous to the components shown in FIG. 2A include similar numbering (i.e., the last 2 digits of the number are the same, while the first digit is different).

The multi-zone irrigation flow controller 628 may further include irrigation water consumption data 636 comprising zone data 637. The zone data 637 indicates the amount of water consumed by each valve 690a-c (i.e., consumed by each zone or station of the system 600). The zone data 637 may be calculated, for example, by determining the end and start time for each valve 690a-c and, based on the general water consumption data, identifying the amount of water consumed during those periods, such as by using the pulse detecting device 124 illustrated in FIG. 3. In other embodiments, the valves 690a-c (using the meters 691a-c) may transmit the data 232 related to each valve 690a-c to the flow controller 628 in order to calculate the zone data 637.

The flow controller 628 may further comprise historical data 641. The historical data 641 may comprise dates and times associated with irrigation water flow data 232, water meter flow data 234, irrigation water consumption data 636, and non-irrigation water consumption data 238. The historical data 641 may be used for various purposes. For example, the historical data 641 may be used by the leak detection component 674 to determine when a leak notification should be generated by comparing historical data 641 to current data 636, 637. A significant jump in the current data 636, 637 relative to the historical data 641 could trigger a leak notification. The leak notification may be transmitted to an end-user device 626 for viewing by one or more users 110 (shown in FIG. 1) in various ways, such as on the end-user device 626, described in more detail subsequently.

Also, using the historical data 641 related to the zone data 637, the leak detection component 674 may generate a leak notification associated with a particular zone or valve 690 a-c. A comparison could be made between the historical data 641 for a particular zone and the current data for that zone within corresponding periods of time (e.g., the same day or set of days one year ago). In various embodiments, a threshold value may be used to determine whether a leak notification for a particular zone or valve 690a-c will be generated. For example, one threshold value could be based on a percentage change in the flow volume, while another threshold value could be based on a change in a certain number of gallons or liters used over a particular period of time. In various embodiments, as another example, a 20% increase in flow over a prior period of time could trigger the generation of a leak notification. The leak detection component 674 could also take into consideration a change in the time that a valve 690a-c remains open in order to determine whether a leak notification should be generated. For example, a high flow rate for a period of time when the valves 690a-c should be closed could also form a basis for generating a leak notification.

In addition, the historical data 641 may be used to determine when a sprinkler system may have been inadvertently turned off (e.g., the user 110 turned off the sprinkler system for a yard party and forgot to turn the sprinkler system on again). This determination may be made in conjunction with, for example, temperature and/or precipitation data 643, 645 (e.g., the temperature has exceeded 90° for three consecutive days with no rain in the area of interest and no irrigation cycle has been initiated within that period). When such a determination is made, a corresponding notification may be sent to a device for review by the user 110.

The multi-zone irrigation flow controller 628 could also be coupled to a computer network 640, such as the Internet and/or a local area network. The computer network 640 may enable the flow controller 628 to receive weather data, including temperature data 643 and precipitation data 645, from the weather station 695. The received temperature data 643 and/or precipitation data 645 may be stored in the data store 630. The flow controller 628 may include a temperature sensor 672 and may also be coupled to a precipitation sensor or moisture sensor 646. The temperature data 643 may thus be calculated and received from the temperature sensor 672 rather than, or in addition to, receiving the temperature data 643 through the computer network 640. Also, the precipitation data 645 (or related moisture data) may be obtained from the precipitation or moisture sensor 646 rather than, or in addition to, receiving the precipitation data 645 through the computer network 640. The temperature data 643 and precipitation data 645 may be utilized to adjust the time period during which each of the valves 690a-c remains in an open state. For example, if the temperature data 643 indicates that the conditions are generally cooler than an analogous period, the period of time in which each of the valves 690a-c is open may be decreased to avoid wasting water using one or more of the commands 430 (shown in FIG. 4). The weather station 695 could pertain to a particular user 110, area, residence, or business or could be utilized by a number of users 110. The weather station 695 may further comprise a data storage facility for storing temperature data 643 and/or precipitation data 645 (or other types of weather data, such as wind data or barometric pressure data) for a variety of different physical locations and thus may comprise a server of some kind.

The multi-zone irrigation flow controller 628 may also receive data (e.g., pulses) from the pulse detecting device 124 (illustrated in FIG. 4) to ascertain, for example, water meter flow data 234 for use in computing irrigation water consumption data 236 and/or non-irrigation water consumption data 238.

The computer network 640 may also enable the flow controller 628 to communicate with a first server 652 and an end-user device 626. With reference to all of the Figures of this application, each of the components illustrated in the flow controllers 128, 628, 728 may be embodied or implemented within the first server 152, 652, 752 and/or the end-user device 626. In various embodiments, the end-user device 626 is directly coupled through a wired or wireless connection to the first server 152, 652 rather than communicating with the first server 152, 652 through the networks 140, 640. The end-user device 626 may comprise, for example, a tablet, laptop, smartphone, notebook or desktop computer, including the associated software. The first server 152, 652 may comprise hardware and software (e.g., an operating system, volatile and non-volatile storage devices, a processor, and/or communication hardware).

In view of the foregoing, systems and methods for measuring water consumption for irrigation and non-irrigation purposes are disclosed within this application. A pulse generating device may interact with a water meter 310 and generate a pulse based on the amount of water passing through the water meter 310. For example, the pulse generating device may generate a pulse for each tenth of a gallon of water passing through the water meter 310. The pulse may be transmitted via a wired or wireless connection to one or more pulse detecting devices 124.

Figure 7:
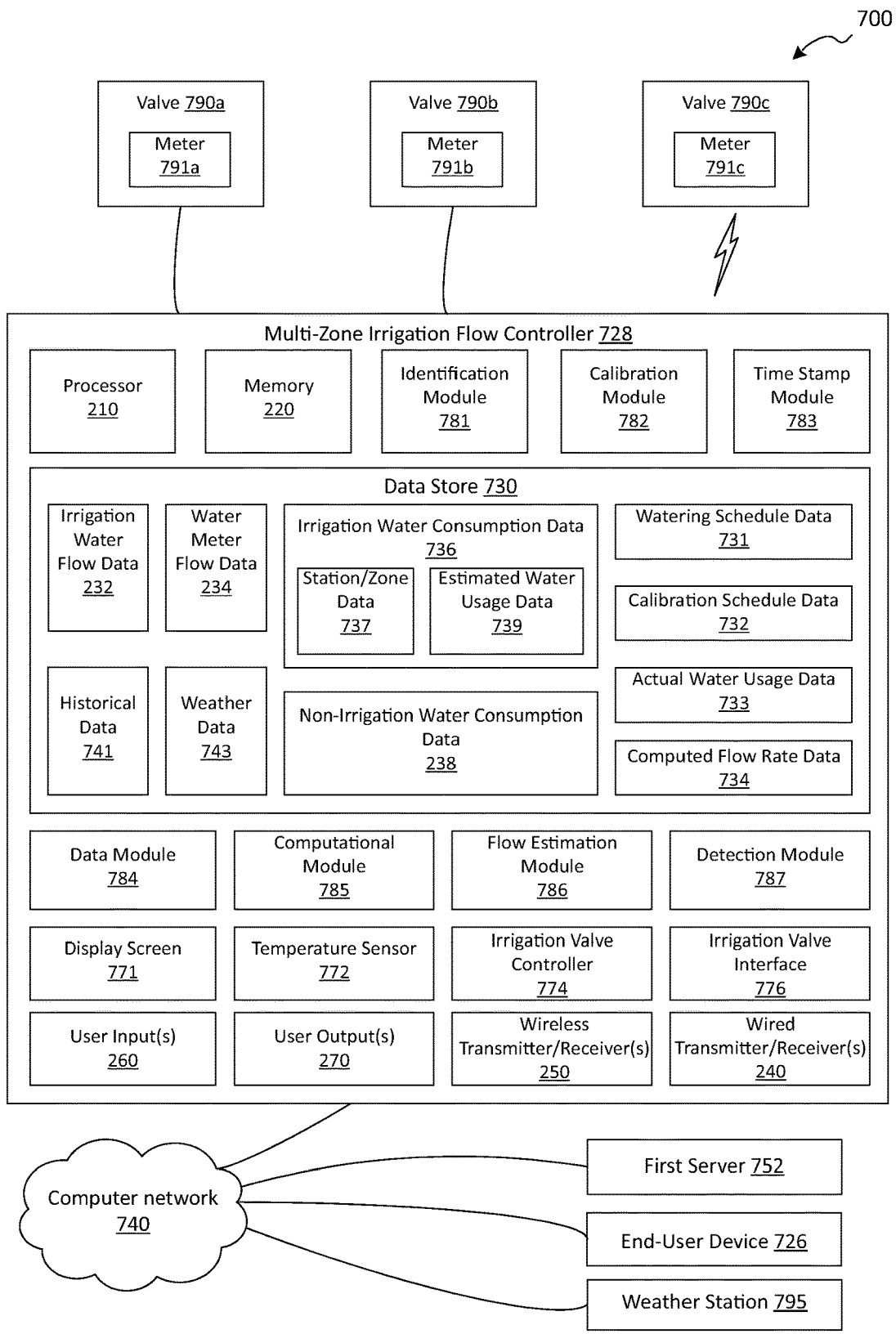
FIG. 7 is a schematic block diagram illustrating one embodiment of a system for measuring water consumption and performing other functions.

FIG. 7 illustrates one embodiment of a system 700 for measuring water consumption pertinent to a water-monitored property and for performing other functions. The system 700 may include one or more irrigation valves 790a-c, a multi-zone irrigation flow controller 728, a computer network 740, a weather station 795, a first server 752 and an end-user device 726.

Each of the irrigation valves 790a-c may be associated with an optional meter 791a-c. Each meter 791a-c may monitor the amount of water flowing through each of the valves 790a-c. Water meter flow data 234 may be related to the amount of water flowing through each of the valves 790a-c and may be transmitted wirelessly or via a wired connection to the multi-zone irrigation flow controller 728. The water meter flow data 234 may be in the form of an electronic signal that uniquely identifies each valve 790a-c to which the water meter flow data 234 pertains in order to distinguish the water meter flow data 234 related to each of the valves 790a-c. The meters 791a-c may be positioned in alternative locations throughout the system 700. For example, a single meter 791a-c could pertain to multiple valves 790a-c or all of the valves 790a-c. In various embodiments, one or more of the valves 790a-c could comprise the hose-attached irrigation flow controller 330, 410 shown in FIGS. 3 and 4.

The number of irrigation valves 790a-c and meters 791a-c shown in FIG. 7 is merely illustrative. Accordingly, the number of irrigation valves 790a-c and meters 791a-c may be varied within the scope of the disclosed subject matter or, in certain embodiments, may be entirely omitted from the system 700.

The multi-zone irrigation flow controller 728 may include similar components and functionality included in the multi-zone irrigation flow controllers 128, 628 shown in FIGS. 2A and 6. Components which are common to the flow controller 728 and both of the flow controllers 128, 628 of FIGS. 2A and 6 include the same reference numerals and perform generally the same function and, accordingly, will not be described again. Components shown in FIG. 7 that may be analogous to the components shown in FIG. 2A and FIG. 6 include similar numbering (i.e., the last 2 digits of the number are the same, while the first digit is different).

The multi-zone irrigation flow controller 728 of FIG. 7 may further include an identification module 781, a calibration module 782, a timestamp module 783, a data module 784, a computational module 785, a flow estimation module 786, a detection module 787, a display screen 771, a temperature sensor 772, an irrigation valve controller 774, and an irrigation valve interface 776. The data store 730 of the multi-zone irrigation flow controller 728 may also include historical data 741, weather data 743, watering schedule data 731, calibration schedule data 732, actual water usage data 733, computed flow rate data 734, and irrigation water consumption data 736 comprising zone data 737 and estimated water usage data 739.

The zone data 737, or station data, may indicate the amount of water consumed by each valve 790a-c (i.e., consumed by each zone or station of the system 700). In some embodiments, the valves 790a-c (using the meters 791a-c) may transmit the data related to each valve 790a-c to the flow controller 728 in order to calculate the zone data 737. In other embodiments, the zone data 737 may be calculated, for example, by determining the end and start time for each valve 790a-c and computing an estimated amount of water consumed during those periods by multiplying the total time a valve 790a-c is operated by a computed flow rate (as explained below) for that valve 790a-c.

The irrigation valve interface 776 may be configured to place the multi-zone irrigation flow controller 728 in electronic communication with the one or more irrigation valves 790a-c. In various embodiments, each of the one or more irrigation valves 790a-c may be associated with watering a particular zone or station of the water-monitored property. In these and other embodiments, the irrigation valve controller 774 may be configured to transmit electrical signals to the one or more irrigation valves 790a-c via the irrigation valve interface 776 to systematically open and close the one or more irrigation valves 790a-c in accordance with the watering schedule data 731 and/or the calibration schedule data 732.

In various embodiments, the multi-zone irrigation flow controller 728 may be configured to estimate irrigation water consumption for each zone of the water-monitored property based on computed flow rates associated with each zone and a total operational time for each valve 790a-c in a given zone over a selected time period of interest. In particular, the multi-zone irrigation flow controller 728 may be configured to perform a calibration process (as explained below) to ascertain computed flow rates for each valve 790a-c, which may then be used to find the estimated water usage for each valve 790a-c over time.

The identification module 781 may be configured to identify one or more time periods when water consumption is not likely to occur or is likely minimal within the water-monitored property. In particular, the identification module 781 may receive a first actual water usage data representative of actual water usage for the water-monitored property over an initial period of time. For example, the first actual water usage data may comprise actual water usage data for the water-monitored property that has occurred over a past time period such as a day, a week, a month, etc. In various embodiments, the identification module 781 may receive the first actual water usage data directly from the meters 791a-c associated with the valves 790a-c, as previously described.

In other embodiments, the identification module 781 may indirectly receive the first actual water usage data from a water utility entity. The water utility entity may be, for example, a municipality that measures the water consumption of the water-monitored property and charges the owner of the water-monitored property for corresponding water consumption. The water utility entity may utilize a smart meter (not shown) to electronically collect water meter flow data 234 for the water-monitored property. The smart meter may measure water flow and generate water meter flow data 234 in discrete time period increments. For example, the smart meter may be configured to measure total water flow over incremental time periods such as every minute, every five minutes, five minutes, every fifteen minutes, every hour, etc. Each incremental time period may be associated with a timestamp that identifies when the water consumption occurred. The smart meter may electronically send incremental water meter flow data 234 to the water utility entity in a variety of ways, as will be discussed in more detail below, and the water utility entity may also send incremental water meter flow data 234 to the identification module 781.

The identification module 781 may receive the first actual water usage data from the water utility entity and analyze the first actual water usage data to identify one or more time periods within the first actual water usage data when little or no water consumption occurred for the water-monitored property. Based on the first actual water usage data, the identification module 781 may determine or identify similar time periods in the future in which water usage is unlikely or is likely minimal within the water-monitored property (i.e., little or no water usage occurs from midnight until 6:00 AM at a particular water-monitored property). Accordingly, the identification module 781 may create calibration schedule data 732 for the one or more valves 790a-c to conduct calibrations in the future, based on the one or more identified time periods.

In certain situations, such as industrial settings, water may be used continually. Accordingly, the identification module 781 may not be able to identify a period of time when water usage is unlikely and the identification module may thus identify periods of time when water usage is likely minimal. For example, while water usage may be continual in such a setting, the water usage may be minimized Sunday mornings from 1:00 AM to 5:00 AM each week. The identification module 781 would thus identify this time period for calibration to be conducted. Also, it should be noted that the identification module 781, in various embodiments, may utilize first actual water usage data over an extended period of time in order to identify, for example, daily, weekly or monthly periods of unlikely or minimal water usage. In many cases, periods of minimal or no water usage may be quickly identified by the identification module, such as in most residential use case scenarios.

By way of example only, a water utility entity may collect water meter flow data 234 for a water-monitored property in fifteen-minute increments. The water utility entity may then send a set of incremental water meter flow data 234 to the multi-zone irrigation flow controller 728 for analysis (potentially in response to a request from the multi-zone irrigation flow controller 728). This set of incremental water meter flow data 234 may represent the first actual water usage data that occurred within the water-monitored property over a period of time in the past (e.g., over a week). The identification module 781 may analyze the first actual water usage data and identify one or more time periods within the first actual water usage data when little or no actual water usage occurred within the water-monitored property (for example, between 1:00 AM and 4:00 AM in the morning). The identification module 781 may schedule one or more calibration times between 1:00 AM and 4:00 AM in the future when water usage is expected to be low or non-existent. The identification module 781 may further schedule calibration times for each valve 790a-c within individual fifteen minute increment periods between the identified 1:00 AM and 4:00 AM time period. Accordingly, the calibration schedule data 732 may include data that identifies each valve 790a-c for activation during an individual calibration time period, along with a start time and a stop time for each valve 790a-c. The identification module 781 may further schedule calibration time periods for each valve 790a-c that are sufficiently long enough to negate the effects of latency on flow rates due to slow valve "turn-on" and "turn-off" times. For example, the identification module 781 may schedule each valve 790a-c to come on and run for about three minutes or more in order to increase the accuracy of computed flow rates during calibration time periods by negating the effects of slow valve "turn-on" and "turn-off" times on computed flow rates during calibration time periods. Thus, it may be assumed that all of the water flow measured during a calibration time period may be attributable to the individual valve 790a-c that is activated during a given calibration time period.

In various embodiments, the calibration module 782 may be configured to open and close each of the one or more irrigation valves 790a-c in accordance with the calibration schedule data 732 during a first period of time within the one or more time periods when water consumption is not likely to occur or is likely minimal within the water-monitored property. The timestamp module 783 may also be configured to identify a calibration valve open time and a calibration valve close time for each of the one or more irrigation valves 790a-c in accordance with the calibration schedule data 732 during the first period of time. Moreover, a data module 784 may be configured to receive actual water usage data that occurred between the calibration valve open time and the calibration valve close time for each of the one or more irrigation valves 790a-c during the first period of time. The calibration valve open time and the calibration valve close time may differ from an operation valve open time and an operation valve close time because the calibration valve open and close times occur during calibration processes, whereas the operation valve open and close times occur during normal irrigation processes of the multi-zone irrigation flow controller 728. A computational module 785 may be configured to calculate a first computed flow rate for each of the one or more irrigation valves 790a-c based on the calibration valve open time, the calibration valve close time, and the actual water usage data 733 that occurred between the calibration valve open time and the calibration valve close time during the first period of time. For example, if the time period between the calibration valve open time and the calibration valve close time is three minutes and the actual water usage that occurred during this time period may be 17.8 gallons. Accordingly, the first computed flow rate may be 17.8 gallons divided by 3 minutes, which equals 5.93 gallons per minute.

In this manner, each of the valves 790a-c may be characterized by their individual first computed flow rates, which may be expressed in units of volume per unit of time, such as gallons per minute, liters per minute, or the like. Once the first computed flow rate for each valve 790a-c is known, the estimated irrigation water consumption for each valve 790a-c may be continuously computed by the flow estimation module 786. The flow estimation module 786 may be configured to estimate irrigation water consumption and provide estimated water usage data 739 for at least one particular zone or valve 790a-c of the water-monitored property based on the first computed flow rate for each of the one or more irrigation valves 790a-c for the particular zone and a total operational time for each of the one or more irrigation valves 790a-c associated with watering the particular zone over a selected time period of interest. For example, if the total operational time of a valve over a given time period of interest is 23 minutes and the first computed flow rate for the valve is 7.4 gallons per minute, then the water consumption for the valve over the time period of interest is (23 minutes)×(7.4 gallons/minute)=170.2 gallons.

In various embodiments, the first computed flow rate for each valve 790a-c may be periodically updated or checked against a second computed flow rate for each valve 790a-c to ensure accuracy of computed flow rates for each valve 790a-c. In this embodiment, the calibration module 782 may be configured to open and close each of the one or more irrigation valves 790a-c in accordance with the calibration schedule data 732 during a second period of time within the one or more time periods when water consumption is not likely to occur or is likely minimal within the water-monitored property. The timestamp module 783 may also be configured to identify a calibration valve open time and a calibration valve close time for each of the one or more irrigation valves 790a-c in accordance with the calibration schedule data 732 during the second period of time. The data module 784 may also be configured to receive actual water usage data 733 that occurred between the calibration valve open time and the calibration valve close time for each of the one or more irrigation valves 790a-c during the second period of time. The computational module 785 may further be configured to calculate a second computed flow rate for each of the one or more irrigation valves 790a-c based on the calibration valve open time, the calibration valve close time, and the actual water usage data 733 that occurred between the calibration valve open time and the calibration valve close time during the second period of time, similar to the process discussed above.

Once the second computed flow rate for each valve 790a-c is known, the calibration module 782 may be configured to compare the first computed flow rate to the second computed flow rate for each valve 790a-c and average the first computed flow rate with the second computed flow rate if the second computed flow rate is within a first percentage difference of the first computed flow rate. By way of example only, if the second computed flow rate is within 5% of the first computed flow rate, then the first computed flow rate may be averaged with the second computed flow rate. However, if the second computed flow rate is within a second percentage difference of the first computed flow rate (e.g., greater than 5%), then the calibration module 782 may be configured to conduct further calibrations to try and determine which computed flow rate is more likely to be accurate and/or which computed flow rate was affected by an anomaly that occurred during one of the two calibration sessions. For example, if a sprinkler head broke between the first and second set of calibrations the computed flow rates would likely be quite different.

The resolution of the actual water usage data 733 may affect the timing at which the calibration module 782 will initiate the calibration process for each zone. For example, if actual water usage data 733 may only be obtained in hour increments, the calibration module 782 will initiate the calibration process for each zone at least one hour apart to ensure that the actual water usage data 733 gathered pertains only to one particular zone during the calibration process.

Figure 9A:
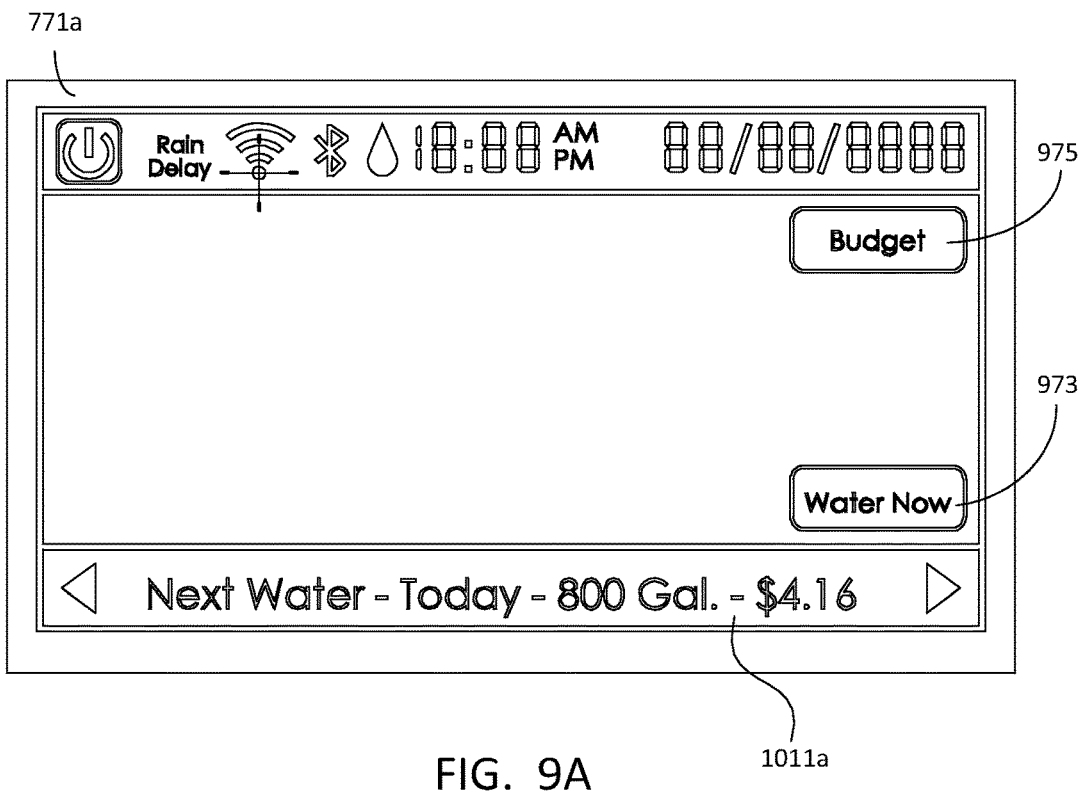
FIGS. 9A-11B illustrate various embodiments of a display screen for an irrigation flow controller.
Figure 9B:
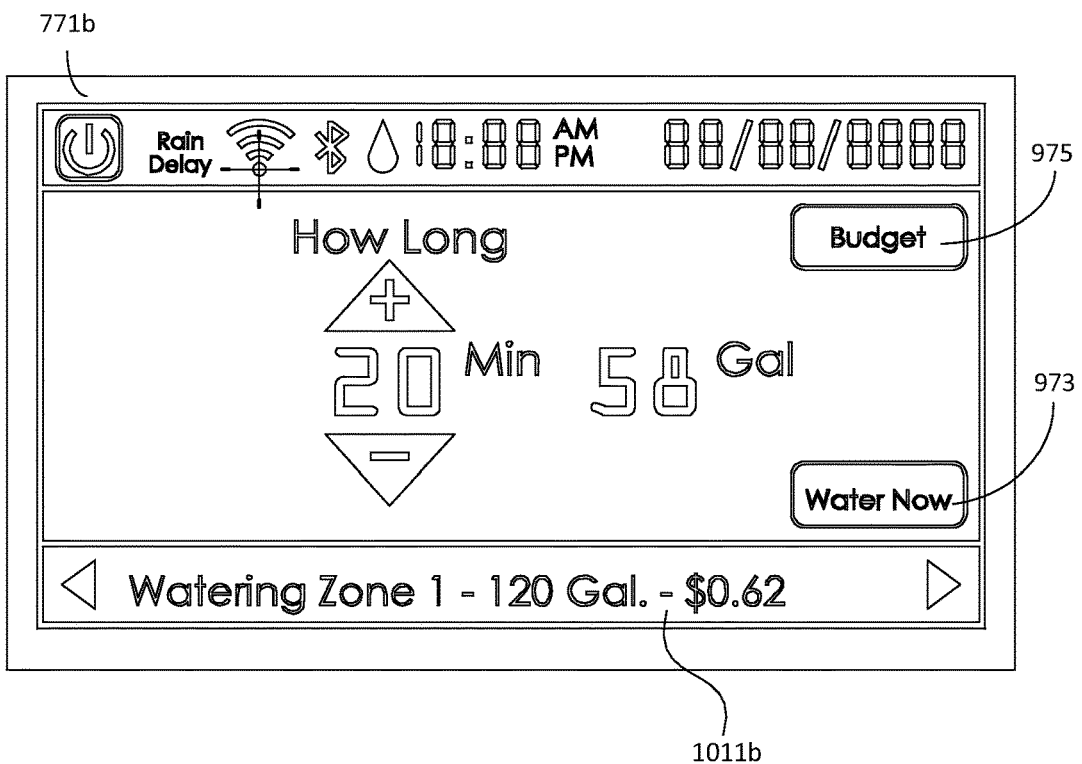
Figure 10A:
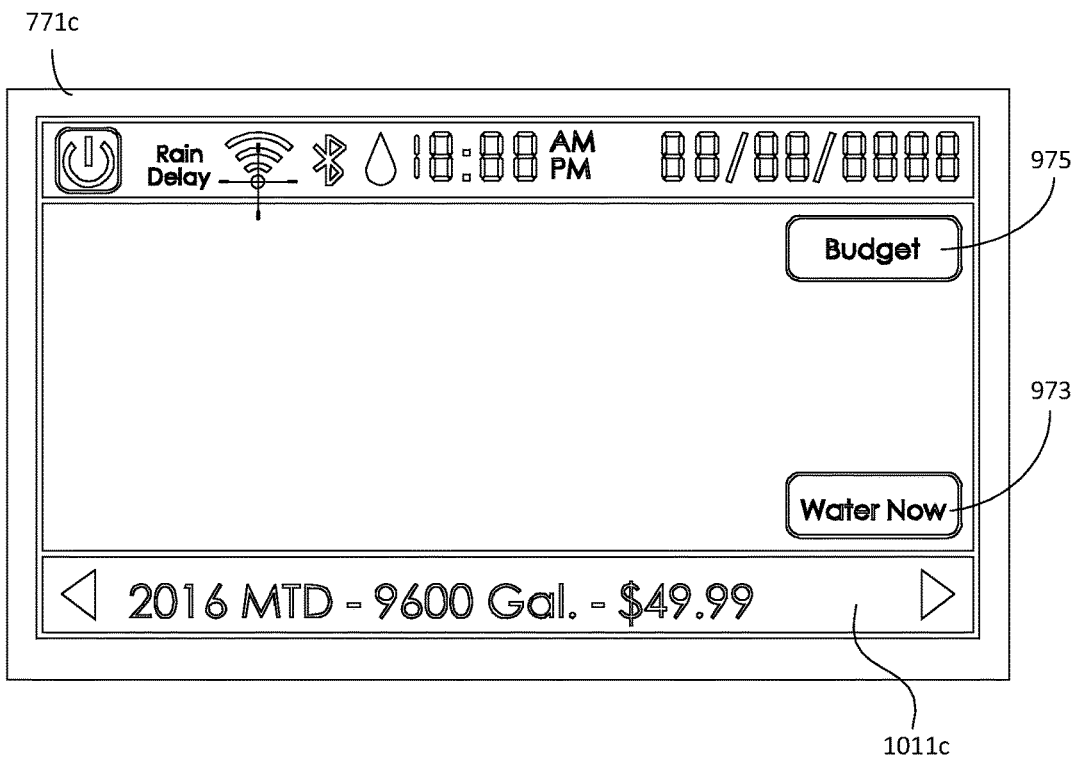
Figure 10B:
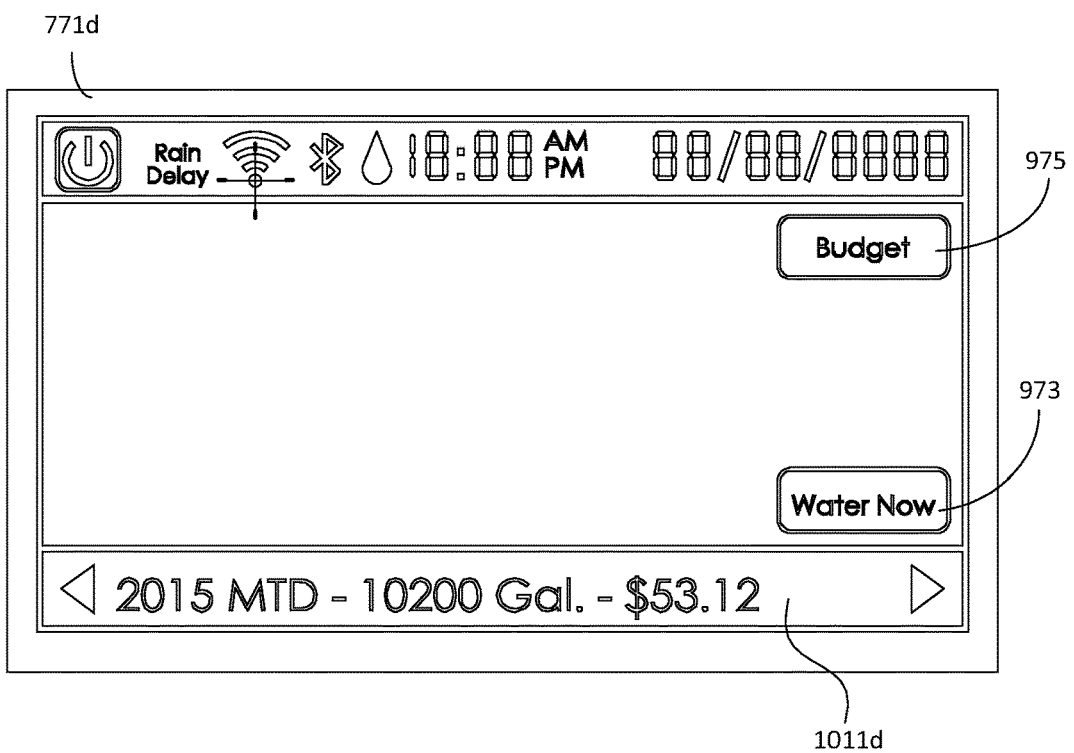
Figure 11A:
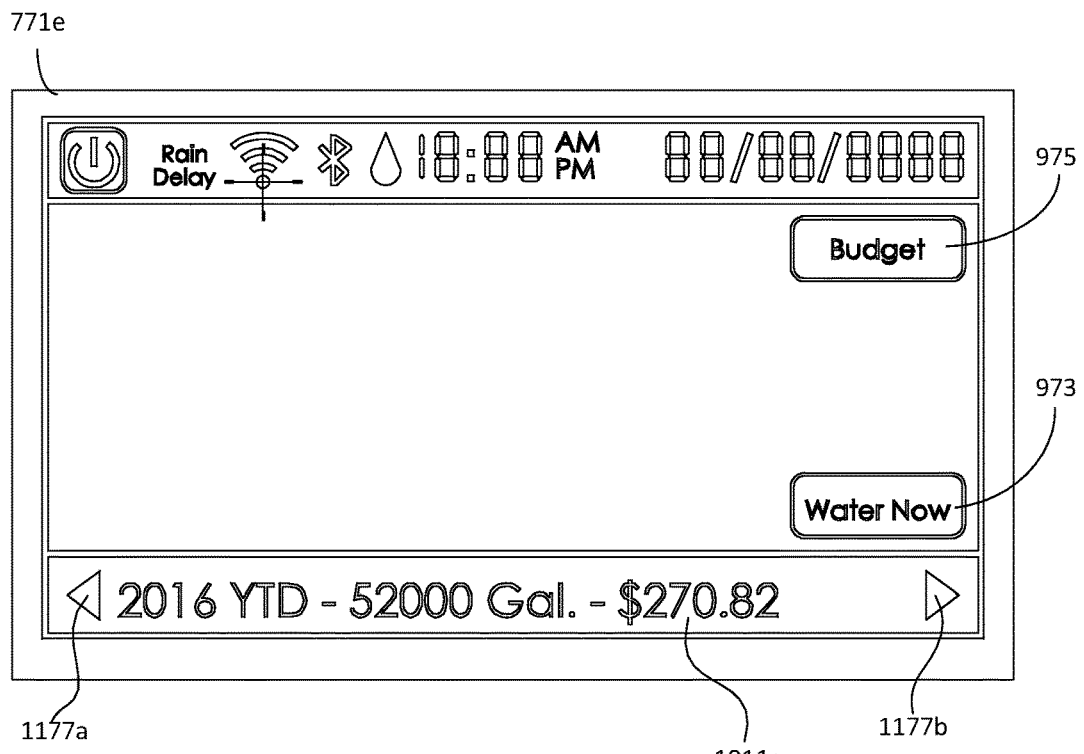
Figure 11B:
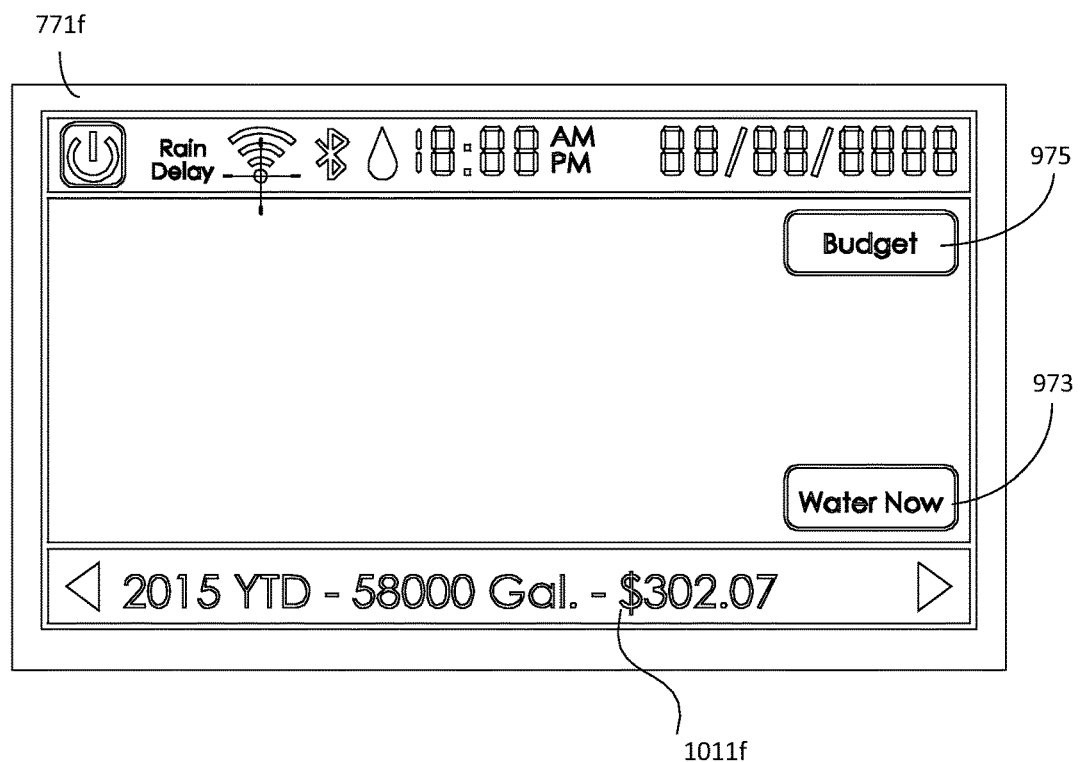

The display screen 771 of the multi-zone flow controller 728 may be configured to display at least one of the estimated water usage data 739 in real time, the estimated water usage data 739 over a selected time period of interest, and/or a comparison between a first estimated water usage data over a first selected time period of interest and a second estimated water usage data over a second selected time period of interest. FIGS. 9A-11B illustrate various embodiments of a display screen 771a-f that may be used with any of the multi-zone irrigation flow controllers 128, 628, 728 of the present disclosure. The embodiments illustrated in these figures are merely exemplary and are not exhaustive of the potential configurations for such a screen 771. FIG. 9A shows the sample display screen 771a displaying a message 1011a at the bottom of the display screen 771a indicating that the next watering event will occur today and will consume about 800 gallons of water at a cost of about $4.16. The "Water Now" button 973 may initiate watering immediately, for example, by progressing through all of the watering zones from the lowest numbered zone to the highest numbered zone. The "Budget" button 975 may allow the user 110 to adjust the water time of a zone, as shown in FIG. 9B. FIG. 9B shows the sample display screen 771b displaying a message 1011b at the bottom of the display screen 771b indicating that zone 1 has been adjusted to increase the watering time to 20 minutes, which will increase water consumption by 58 gallons for a total water usage in zone 1 of 120 gallons for each iteration of watering for zone 1 at a cost of $0.62. FIGS. 10A and 10B comprise display screens 771c-d illustrating a comparison of water usage in a given month between different years (e.g., July 2016 water usage vs. July 2015 water usage) in the messages 1011c-d. FIGS. 11A and 11B comprise display screens 771e-f illustrating a comparison of water usage between different years (e.g., water usage for 2016 vs. water usage for 2015) within the messages 1011e-f. The user 110 may toggle through the information displayed on the bottom of the screen by pressing the left and right arrow keys 1177a-b on the bottom of the display screen 771e-f to view various data, such as the monthly water consumption to date (and for past months), the yearly water consumption to date (and for past years), the cost for water consumption during different time periods, as well as other data described herein.

Figure 12:
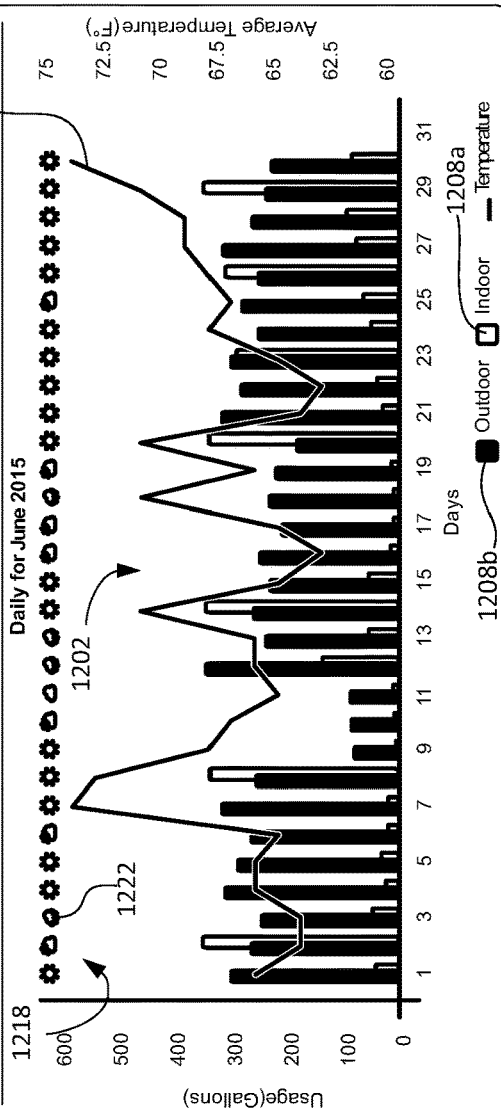
FIG. 12 illustrates one embodiment of a water usage report.

FIG. 12 illustrates one embodiment of water usage report 1200 that may be generated with data produced by embodiments of the present disclosure. The water usage report shown in FIG. 12 may display data related to various items of interest including, but not limited to: daily water usage 1202 over a month due to indoor usage 1208a compare to outdoor usage 1208b (largely irrigation usage), monthly water usage 1204, annual water usage 1206, percentage increases/decreases in water usage 1210a-b, time period comparisons 1212a-c, cost in gallons information 1214a-c, anomaly detection/notifications 1216, and weather data 1218 including temperature data 1220, precipitation data 1222, and the like. The water usage report shown in FIG. 12 may be displayed on any of the computing devices 120 or end-user devices 626, 726 disclosed herein and/or may be generated by the water utility entity and sent directly to the user 110 in electronic and/or paper format.

It will be understood that the illustrative display screen shots shown in FIGS. 9A-11B and the illustrative water usage report shown in FIG. 12 are intended to be non-limiting examples and any number or variation of different display screens, display messages, and water usage reports are contemplated herein in the present disclosure.

Continuing once again with reference to FIG. 7, as mentioned previously, the historical data 741 may comprise dates and times associated with irrigation water flow data 232, water meter flow data 234, irrigation water consumption data 736, and non-irrigation water consumption data 238. The historical data 741 may be used for various purposes. For example, as indicated above, the historical data 741 may be used by the detection module 787 to determine when an anomaly has occurred, such as a leak, an excessive flow condition, an under-flow condition, a no-flow condition and the like. The anomaly could be due to a broken pipe, either upstream or downstream of a valve. A broken pipe upstream of the valve 790a-c may manifest by high water usage both during and outside of operation of the sprinkler system. A broken pipe or a broken sprinkler head downstream of the valve 790a-c may be manifest by higher water usage during operation of that particular valve 790a-c. The detection module 787 may be configured to detect at least one water consumption anomaly based on a comparison between the estimated water usage data 739 and the actual water usage data 733 over a period of interest. The detection module may be further configured to generate a notification based on a specified threshold discrepancy between the estimated water usage data 739 and the actual water usage data 733 over the period of interest. (The threshold discrepancy may be specified, for example, by an end-user, a manufacturer or through an algorithm.) The detection module 787 may determine whether a notification related to a detected anomaly should be generated by comparing historical data 741 to current data 736. A significant jump or decline in the current data 736 relative to the historical data 741 could trigger various notifications depending on the nature of the anomaly detected. The appropriate anomaly notification may be transmitted to an end-user device 726 for viewing by one or more users 110 in various ways, such as on the end-user device 726, or via the display screen 771 of the multi-zone flow controller 728.

Furthermore, the detection module 787 may generate notifications associated with a particular zone or valve 790 a-c based on historical data 741 related to the zone data 737. A comparison could be made between the historical data 741 for a particular zone and the current data 736 and may be performed based on a certain period of time or on a certain instance in time. In various embodiments, a threshold value may be used to determine whether a leak notification for a particular zone or valve 790a-c will be generated. For example, one threshold value could be based on a percentage change in the flow volume, while another threshold value could be based on a change in a certain number of gallons or liters over a particular period of time. In various embodiments, as another example, a 20% increase in flow over a prior period of time could trigger the generation of a leak notification. The detection module 787 could also take into consideration a change in the time that a valve 790a-c remains open in order to determine whether a notification should be generated. For example, a high flow rate for a period of time when the valves 790a-c should be closed could also form a basis for generating a notification.

Figure 13A:
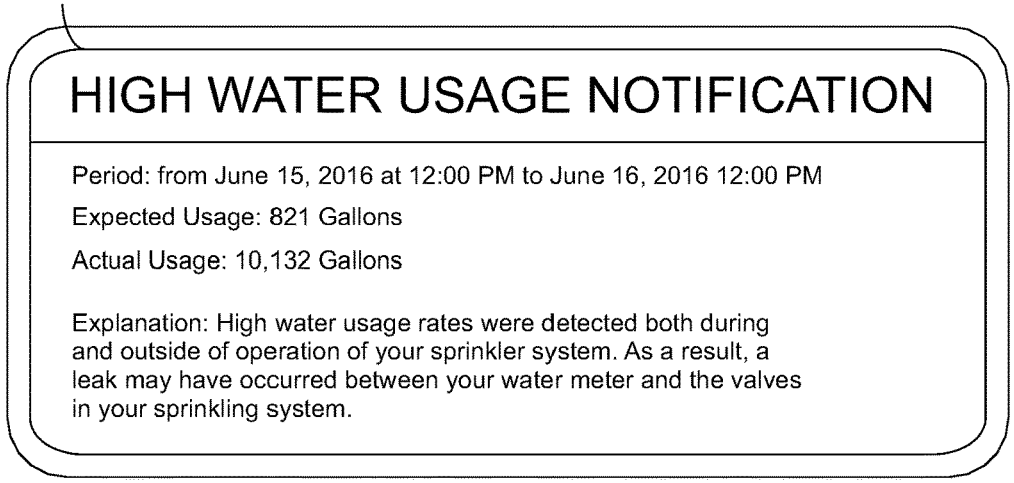
FIGS. 13A-C illustrate various embodiments of water usage notifications.
Figure 13B:
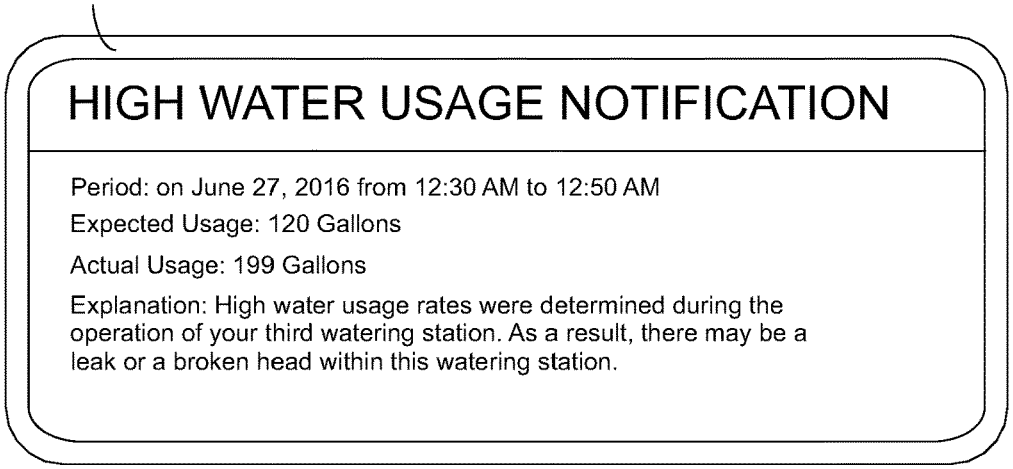
Figure 13C:
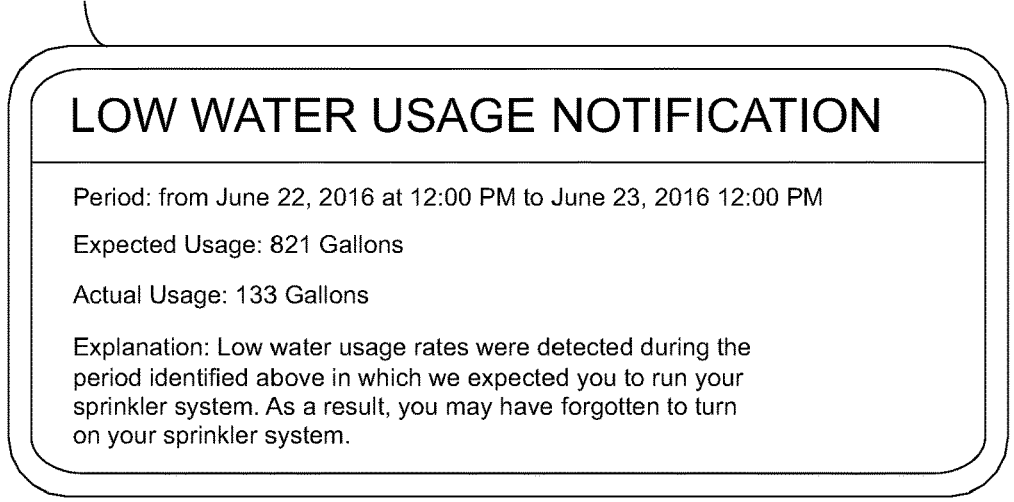

FIGS. 13A-13C illustrate various embodiments of water usage notifications 1355a-c that may be generated by the detection module 787. FIG. 13A shows a notification 1355a indicating that a leak may have occurred between the water meter 310 and the valves 790a-c. FIG. 13B shows a notification 1355b indicating that a leak may exist in a particular water zone and FIG. 13C shows a notification 1355c indicating that the user 110 may have forgotten to turn on the sprinkler system. It will be understood that the foregoing exemplary notifications shown in FIGS. 13A-C are non-limiting and any number or variation of different notifications are contemplated within the scope of this disclosure.

Continuing once again with FIG. 7, the multi-zone irrigation flow controller 728 may also be coupled to a computer network 740, such as the Internet and/or a local area network. The computer network 740 may enable the multi-zone irrigation flow controller 728 to receive weather data 743, such as temperature data, precipitation data, wind data, and the like from the weather station 795. The received weather data 743 may be stored in the data store 730. The multi-zone irrigation flow controller 728 may also include a temperature sensor 772 and the temperature data may also be calculated and received from the temperature sensor 772 rather than, or in addition to, receiving the temperature data through the computer network 740. The weather data 743 may be utilized to adjust the time period during which each of the valves 790a-c remains in an open state. For example, if the temperature data indicates that the conditions are generally cooler than an analogous period, or if precipitation is detected, then the period of time in which each of the valves 790a-c is open may be decreased to avoid wasting water using one or more of the commands 430 (shown in FIG. 4). Wind data reflecting higher than normal winds may cause an increase in watering times for each zone as additional evaporation or transpiration may occur or if wind occurs during watering, some water may be carried by the wind off of the water-monitored property before reaching the desired plants. The weather station 795 could pertain to a particular user 110 area, residence, or business or could be utilized by a number of users 110. The weather station 795 may further comprise a data storage facility for storing weather data 743 for a variety of different physical locations and thus may comprise a server of some kind.

The multi-zone irrigation flow controller 728 may also receive data (e.g., pulses) from the pulse detecting device 124 (illustrated in FIG. 4) to ascertain, for example, water meter flow data 234 for use in computing irrigation water consumption data 236 and non-irrigation water consumption data 238.

The computer network 740 may also enable the multi-zone flow controller 728 to communicate with a first server 752 and an end-user device 726. With reference to all of the Figures of this application, each of the components illustrated in the multi-zone irrigation flow controllers 128, 628, 728 may be embodied or implemented within the first server 152, 652, 752 and/or the computing device(s) 120 or end-user device(s) 626, 726. In various embodiments, the end-user device 626, 726 is directly coupled through a wired or wireless connection to the first server 152, 652, 752 rather than communicating with the first server 152, 652, 752 through the network 140, 640, 740. The end-user device 626, 726 may comprise, for example, a tablet, laptop, notebook, smartphone or desktop computer, including the associated software. The first server 152, 652, 752 may comprise hardware and software (e.g., an operating system, volatile and non-volatile storage devices, a processor, and/or communication hardware).

Figure 8:
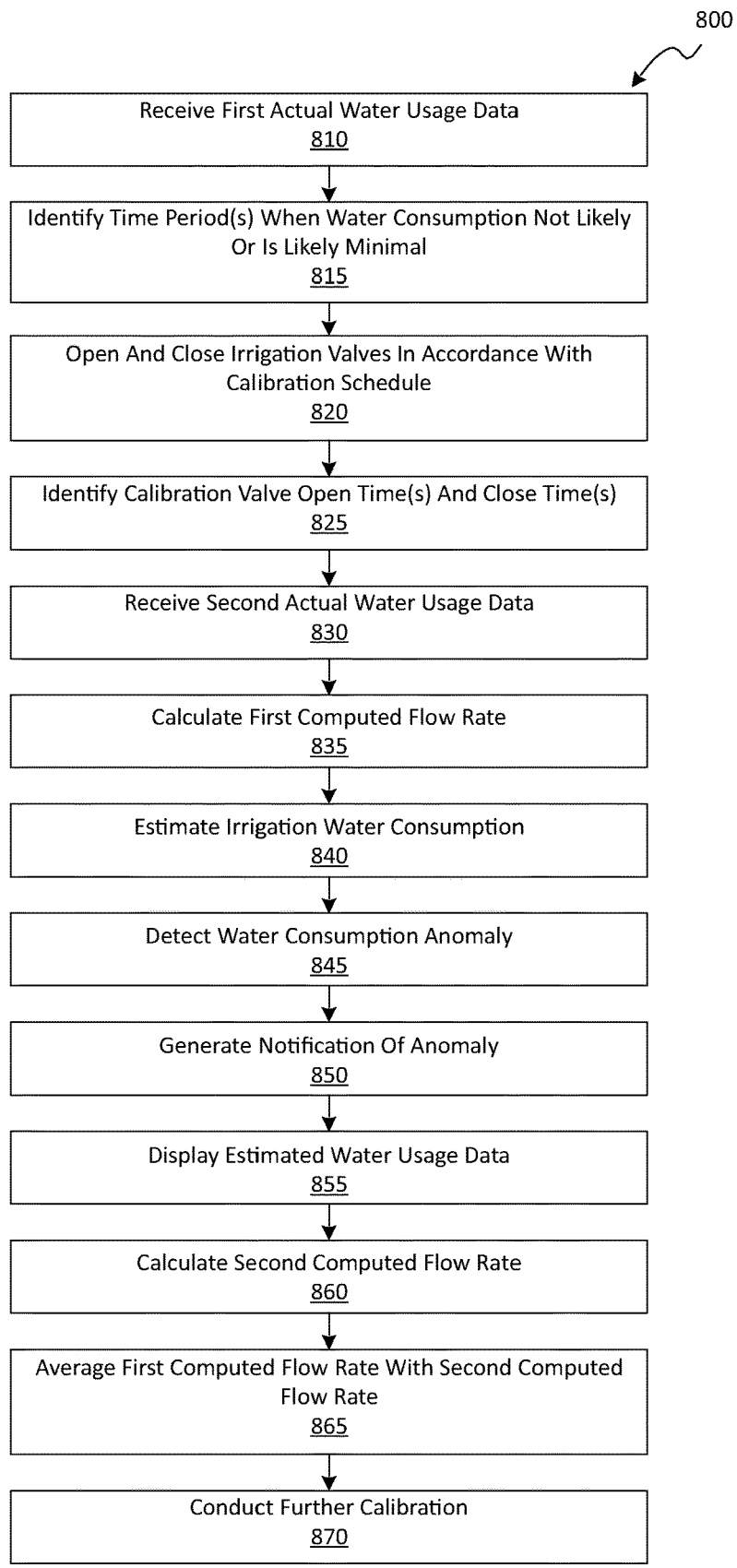
FIG. 8 is a flowchart illustrating one embodiment of a method for measuring water consumption and performing other functions.

FIG. 8 comprises a flowchart illustrating one embodiment of a method 800 for obtaining irrigation water consumption data 736 pertinent to a water-monitored property. The method 800 may be practiced with the system 300 of FIG. 3, the system 400 of FIG. 4, the system 600 of FIG. 6, the system 700 of FIG. 7, or any other system within the scope of the present disclosure. Similarly, the system 300, the system 400, the system 600, and/or the system 700, may operate via the method 800, or via other methods within the scope of the present disclosure.

As shown, the method 800 may start with step 810 in which the first actual water usage data is received by the processor 210 (e.g., the processor 210 of the multi-zone irrigation flow controller 128 of FIG. 2A, the processor 210 of the first server 152 of FIG. 2B, the processor 210 of the multi-zone irrigation flow controller 628 of FIG. 6, the processor 210 of the multi-zone irrigation flow controller 728 of FIG. 7, and/or the processor of end-user devices 626, 726). The first actual water usage data may be received from a water utility entity or from one or more water meters 310, as previously described.

In step 815, one or more time periods in the first actual water usage data may be identified by the processor 210 when water consumption is not likely to occur or is likely minimal within the water-monitored property, as previously described.

In step 820, each of the one or more irrigation valves may be opened and closed in accordance with the calibration schedule data by the processor 210. The calibration schedule data may correspond to a first period of time within the one or more time periods when water consumption is not likely to occur or is likely minimal within the water-monitored property.

In step 825, the calibration valve open time and the calibration valve close time for each of the one or more irrigation valves may be identified by the processor 210 in accordance with the calibration schedule data for the first period of time.

In step 830, the second actual water usage data that occurred between the calibration valve open time and the calibration valve close time for each of the one or more irrigation valves during the first period of time may be received by the processor 210. The second actual water usage data may be received from a water utility entity or from one or more water meters, as previously described.

In step 835, the first computed flow rate for each of the one or more irrigation valves may be calculated by the processor 210 based on the calibration valve open time, the calibration valve close time, and the second actual water usage data that occurred between the calibration valve open time and the calibration valve close time during the first period of time. This calculation may entail, for example, dividing the second actual water usage by the amount of time between the calibration valve open time and the calibration valve close time.

In step 840, irrigation water consumption may be estimated by the processor 210 by providing estimated water usage data for at least one particular zone of the water-monitored property based on the first computed flow rate for each of the one or more irrigation valves associated with watering the particular zone and a total operational time for each of the one or more irrigation valves associated with watering the particular zone over a selected time period of interest.

In step 845, at least one water consumption anomaly may be detected by the processor 210 based on a comparison between the estimated water usage data and a third actual water usage data over the selected time period of interest, as previously described.

In step 850, a notification may be generated by the processor 210 based on a specified threshold discrepancy between the estimated water usage data and the third actual water usage data over the selected time period of interest.

In step 855, the estimated water usage data 739 may be displayed for review by a user 110, for example, on one or more of the end-user devices 726. The estimated water usage data 739 may be displayed in various ways. By way of example, the estimated water usage data 739 is included in each of the sample water usage notifications 1355a-c in FIGS. 13A-C as the "Expected Usage."

In step 860, a second computed flow rate may be calculated by the processor 210 for each of the one or more irrigation valves. The second computed flow rate may be obtained in a similar manner to the first computed flow rate described above in steps 820-835. The second computed flow rate may be based on a calibration valve open time, a calibration valve close time, and a fourth actual water usage data that occurred between the calibration valve open time and the calibration valve close time during a second period of time. This calculation may entail, for example, dividing the fourth actual water usage by the amount of time between the calibration valve open time and the calibration valve close time.

In step 865, the first computed flow rate may be compared to the second computed flow rate by the processor 210 and the first computed flow rate may be averaged with the second computed flow rate if the second computed flow rate is within a first percentage difference of the first computed flow rate.

In step 870, further calibration may be conducted if the second computed flow rate is outside of a second percentage difference of the first computed flow rate in order to determine which of the first and second flow rates is more accurate.

The method steps and/or actions of the method 800 above may be interchanged with one another and one or more method steps and/or actions of method 800 may not be performed by every embodiment disclosed herein.

Figure 14:
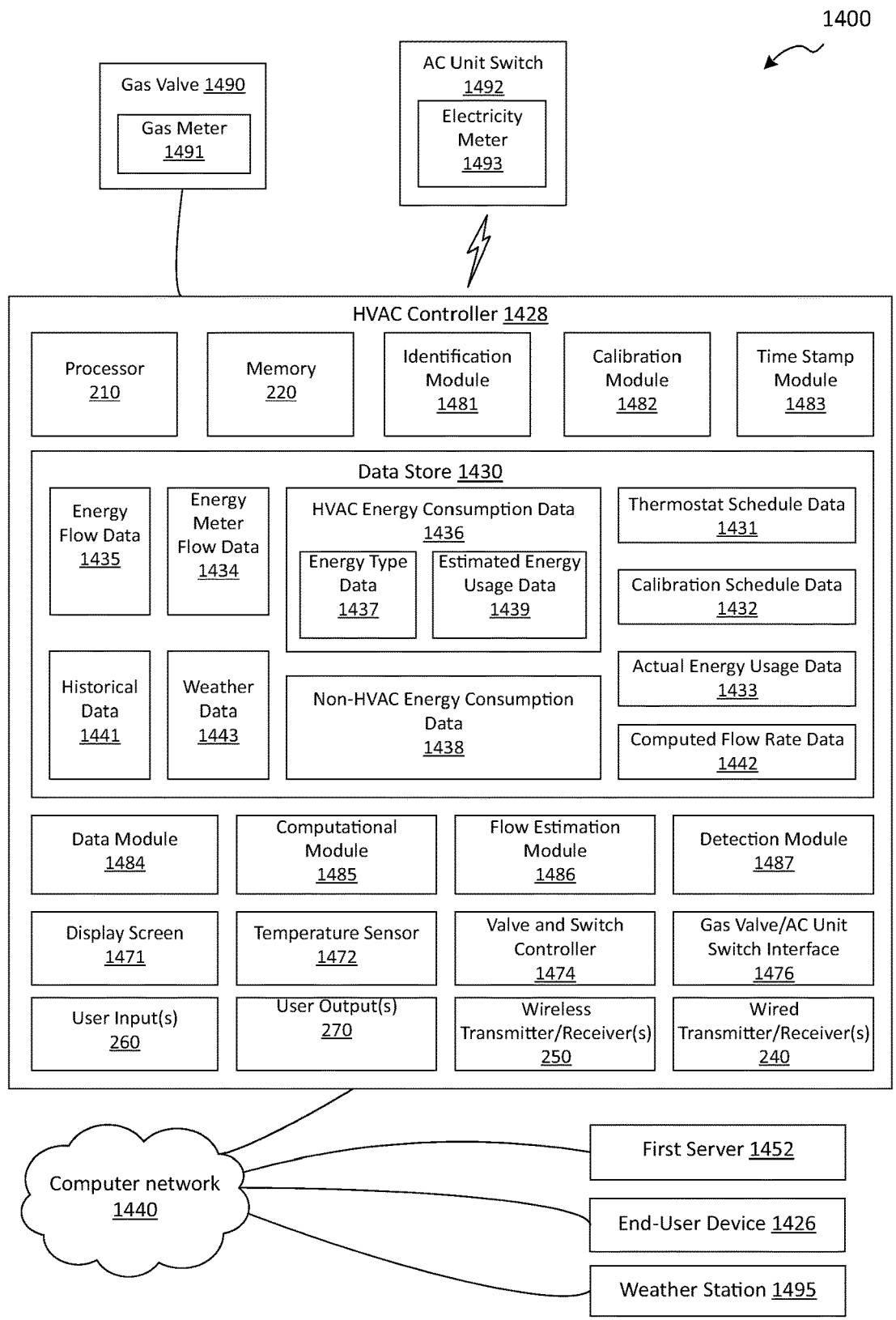
FIG. 14 is a schematic block diagram illustrating one embodiment of a system for measuring HVAC energy consumption and performing other functions.

FIG. 14 illustrates one embodiment of a system 1400 for measuring HVAC ("Heating, Ventilation, and Air Conditioning") energy consumption and performing other functions. The system 1400 may include a gas valve 1490 (for natural gas), an AC unit switch 1492, an HVAC controller 1428, a computer network 1440, a weather station 1495, a first server 1452 and an end-user device 1426.

The gas valve 1490 may be associated with a gas meter 1491 that may monitor the amount of gas flowing through the gas valve 1490. The AC unit switch 1492 may be associated with an electricity meter 1493 that may monitor the amount of electricity consumed by an AC unit (not shown) associated with the AC unit switch 1492. Energy meter flow data 1434 may include gas meter 1491 flow data and electricity meter 1493 flow data, which may be transmitted wirelessly or via a wired connection to the HVAC controller 1428. The energy meter flow data 1434 may be in the form of an electronic signal that uniquely identifies the meter to which the energy meter flow data 1434 pertains in order to distinguish the gas meter 1491 flow data from the electricity meter 1493 flow data.

Although the embodiment shown in FIG. 14 illustrates a single gas valve 1490 and a single AC unit switch 1492, it will be understood that other embodiments are contemplated that include one or more gas valves 1490, gas meters 1491, AC unit switches 1492, and/or electricity meters 1493 which may be varied within the scope of the disclosed subject matter or, in certain embodiments, may be entirely omitted from the system 1400.

The HVAC controller 1428 may include similar components and functionality included in the multi-zone irrigation flow controllers 128, 628, 728 shown in FIGS. 2A, 6, and 7. Components which are common to the HVAC controller 1428 and the multi-zone irrigation flow controllers 128, 628, 728 may include the same reference numerals and perform generally the same function and, accordingly, will not be described again. Components shown in FIG. 14 that may be analogous to the components shown in FIGS. 2A, 6, and 7 may include similar numbering (i.e., the last 2 digits of the number may be the same, while the first two digits may be different).

The HVAC controller 1428 of FIG. 14 may include an identification module 1481, a calibration module 1482, a timestamp module 1483, a data module 1484, a computational module 1485, a flow estimation module 1486, a detection module 1487, a display screen 1471, a temperature sensor 1472, a valve and switch controller 1474, and a gas valve/AC unit switch interface 1476. The data store 1430 of the HVAC controller 1428 may also include energy flow data 1435, historical data 1441, weather data 1443, thermostat schedule data 1431, calibration schedule data 1432, actual energy usage data 1433, computed flow rate data 1442, non-HVAC energy consumption data 1438, and HVAC energy consumption data 1436 comprising energy type data 1437 and estimated energy usage data 1439.

The energy flow data 1435 may comprise gas valve 1490 and AC unit switch 1492 open and close times. The thermostat schedule data 1431 may include desired temperature settings for different times of the day and/or different days of the week for a given energy-monitored property, such as a house or building (not shown). The energy type data 1437 may include data related to the type of energy consumed (e.g., gas, electricity, and the like). The estimated energy usage data 1439 may indicate the amount of energy consumed by each gas valve 1490 and/or each AC unit switch 1492. In some embodiments, the meters 1491, 1493 may directly transmit the energy meter flow data 1434, the energy type data 1437, and/or the estimated energy usage data 1439 for the gas valve 1490 and/or the AC unit switch 1492 to the HVAC controller 1428. In other embodiments, the energy meter flow data 1434, the energy type data 1437, and/or the estimated energy usage data 1439 may be sent to the HVAC controller 1428 by one or more energy utility entities (not shown). In other embodiments, the estimated energy usage data 1439 may be calculated, for example, by determining the open and close times for the gas valve 1490 and the AC unit switch 1492 and computing an estimated amount of energy consumed during those periods by multiplying the total time the gas valve 1490 and the AC unit switch 1492 are open ("on" or "operated") by a computed flow rate, as will be described in more detail below.

The gas valve/AC unit switch interface 1476 may be configured to place the HVAC controller 1428 in electronic communication with the gas valve 1490 and the AC unit switch 1492. In various embodiments, the gas valve 1490 and the AC unit switch 1492 may be associated with heating and cooling the energy-monitored property, respectively. In these and other embodiments, the valve and switch controller 1474 may be configured to transmit electrical signals to the gas valve 1490 and the AC unit switch 1492 via the gas valve/AC unit switch interface 1476 to systematically open and close the gas valve 1490 and the AC unit switch 1492 in accordance with the thermostat schedule data 1431 and/or the calibration schedule data 1432.

In various embodiments, the HVAC controller 1428 may be configured to estimate energy consumption for the energy-monitored property based on computed flow rates associated with each energy type and a total operational time for the gas valve 1490 and/or the AC unit switch 1492 over a selected time period of interest. In particular, the HVAC controller 1428 may be configured to perform a calibration process to ascertain computed flow rates for the gas valve 1490 and the AC unit switch 1492, which may then be used to find the estimated energy usage for the gas valve 1490 and the AC unit switch 1492 individually, or in combination.

The identification module 1481 may be configured to identify one or more time periods when energy consumption (e.g., gas, electricity, or both) is not likely to occur or is likely minimal within the energy-monitored property. In particular, the identification module 1481 may receive a first actual energy usage data representative of actual energy usage for the energy-monitored property over an initial period of time. For example, the first actual energy usage data may comprise actual energy usage data for the energy-monitored property that has occurred over a past time period such as a day, a week, a month, etc. In various embodiments, the identification module 1481 may receive the first actual energy usage data directly from the meters 1491, 1493, as previously described.

In other embodiments, the identification module 1481 may indirectly receive the first actual energy usage data from one or more energy utility entities. The one or more energy utility entities may measure energy consumption of the energy-monitored property and/or charge the owner of the energy-monitored property for energy consumption.

Figure 16:
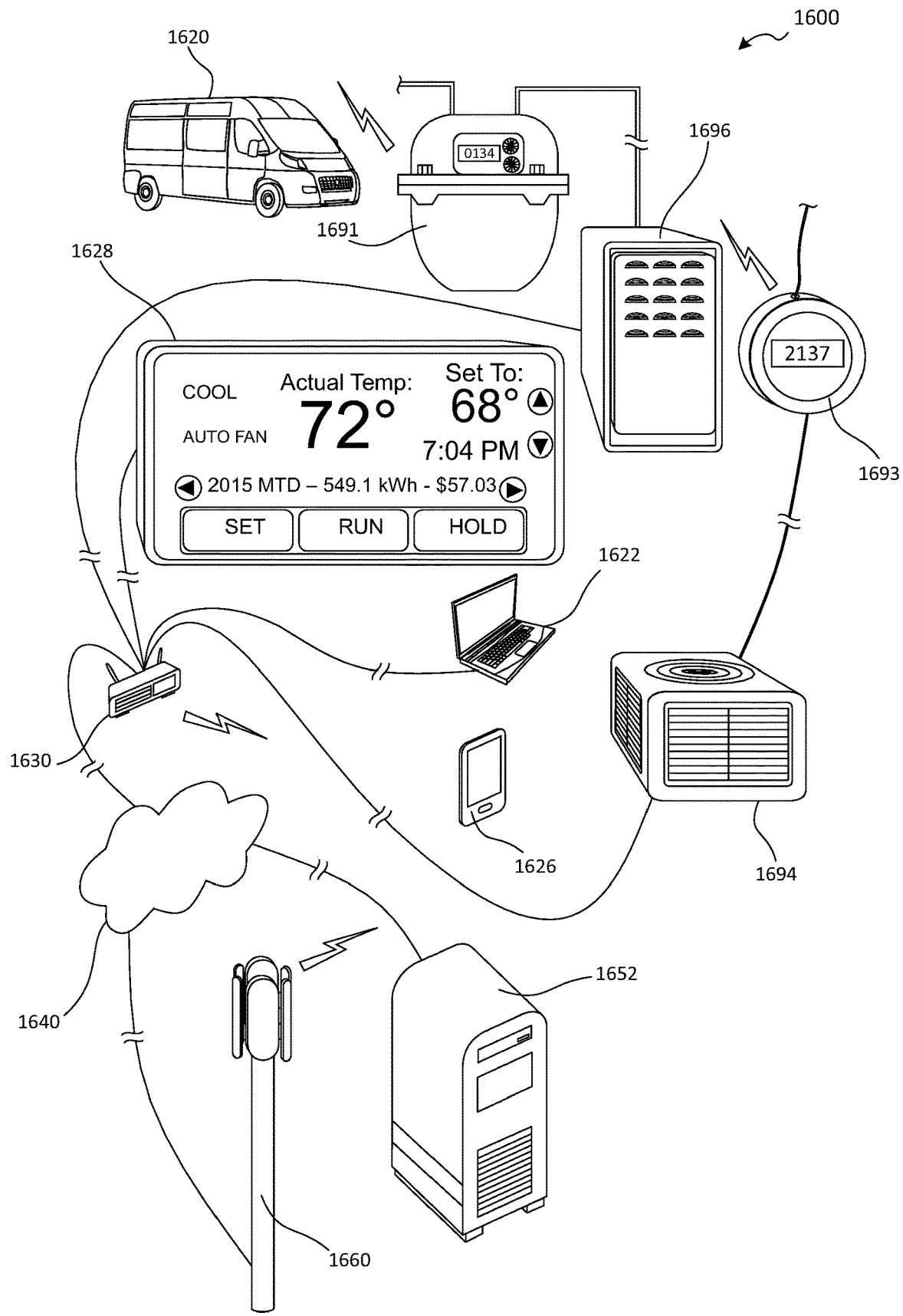
FIG. 16 is a schematic block diagram illustrating one embodiment of a system for communicating HVAC energy consumption data and other information.

FIG. 16 illustrates a schematic block diagram of one embodiment of a system 1600 for communicating data related to an HVAC system. The system 1600 may include an HVAC controller 1628, a router 1630, one or more computing devices such as a laptop 1622 and a smartphone 1626, a computer network 1640, a cell phone tower 1660, a server 1652, an AC unit 1694, an electricity meter 1693 associated with the AC unit 1694, a heating unit 1696, a gas meter 1691 associated with the heating unit 1696, and a data collection vehicle 1620. The gas meter 1691 and the electricity meter 1693 may be smart meters with communication capabilities.

The HVAC controller 1628 may send electronic commands to the AC unit 1694 and the heating unit 1696 and the HVAC controller 1628 may also be remotely programmed and/or controlled via the laptop 1622 or the smartphone 1626, as previously discussed in other embodiments.

The one or more energy utility entities may utilize the smart meters 1691, 1693 to electronically collect energy meter flow data 1434 for the energy-monitored property. The smart meters 1691, 1693 may measure energy flow, such as natural gas flow and/or electricity flow and may generate energy meter flow data 1434 in discrete time period increments. For example, the smart meters 1691, 1693 may be configured to measure total energy flow over incremental time periods, such as every five minutes, every fifteen minutes, every hour, etc. Each incremental time period may be associated with a timestamp that identifies when the energy consumption occurred. The smart meters 1691, 1693 may electronically send the energy meter flow data 1434 to the one or more energy utility entities in a variety of ways. For example, the smart meters 1691, 1693 may wirelessly transmit energy meter flow data 1434 to the data collection vehicle 1620 when the data collection vehicle 1620 comes into close proximity with the smart meters 1691, 1693. Alternatively, or in addition thereto, the smart meters 1691, 1693 may wirelessly (or via wired connections) transmit energy meter flow data 1434 to the router 1630, the cell phone tower 1660, a wireless transceiver in a nearby telephone pole (not shown), the HVAC controller 1628, and/or the one or more computing devices, such as the laptop 1622 and the smartphone 1626. The one or more energy utility entities may also send energy meter flow data 1434 to the HVAC controller 1628 via the computer network 1640 and/or the router 1630 from the server 1652, which may be the server of a municipality, or other gas or electricity monitoring entity.

Continuing, once again, with FIG. 14, the identification module 1481 may receive the first actual energy usage data from the one or more energy utility entities and analyze the first actual energy usage data to identify one or more time periods within the first actual energy usage data when little or no energy consumption occurred within the energy-monitored property. Based on the one or more previously identified time periods, the identification module 1481 may also be configured to identify analogous time periods in which energy is not likely to be used. Accordingly, the identification module 1481 may create calibration schedule data 1432 for the gas valve 1490 and the AC unit switch 1492 to conduct calibration processes in the future, based on the one or more identified time periods.

By way of example only, an energy utility entity may collect energy meter flow data 1434 for an energy-monitored property in incremental time periods of every fifteen minutes. The energy utility entity may then send a set of incremental energy meter flow data 1434 to the HVAC controller 1428 for analysis. This set of incremental energy meter flow data 1434 may represent the first actual energy usage data that occurred within the energy-monitored property over a period of time in the past (e.g., over a time period of a week, as one example). The identification module 1481 may analyze the first actual energy usage data and identify one or more time periods within the first actual energy usage data when little or no actual energy usage occurred within the energy-monitored property (for example, between 1:00 AM and 4:00 AM in the morning). The identification module 1481 may then schedule one or more calibration times between 1:00 AM and 4:00 AM in the future when energy usage is expected to be low or non-existent. The identification module 1481 may further schedule calibration times for the gas valve 1490 and/or the AC unit switch 1492 within individual fifteen minute increment periods between the identified 1:00 AM and 4:00 AM time period. Accordingly, the calibration schedule data 1432 may include data that identifies the gas valve 1490 and the AC unit switch 1492 for activation during an individual calibration period time, along with a start time and a stop time for the gas valve 1490 and the AC unit switch 1492. The identification module 1481 may further schedule calibration time periods for the gas valve 1490 and/or the AC unit switch 1492 that are sufficiently long enough to negate any effects due to slow valve "turn-on" and "turn-off" times. For example, the identification module 1481 may schedule the gas valve 1490 to come on and run the heating unit 1696 for about three minutes (or more) to increase the accuracy of the computed flow rate during the calibration time period. Thus, it may be assumed that all of the energy flow measured during a calibration time period may be attributable to the gas valve 1490 and/or the AC unit switch 1492. As a further example, in various embodiments, calibration for a furnace may occur in the early morning hours during the summertime when the furnace is not otherwise likely to be used (and other gas-power devices are also unlikely to be used) and, alternatively, calibration of an air conditioner may take place in the early morning hours during the winter time when the air conditioning unit is unlikely to be used.

In various embodiments, the calibration module 1482 may be configured to open and close the gas valve 1490 and/or the AC unit switch 1492 in accordance with the calibration schedule data 1432 during a first period of time when energy consumption is not likely to occur or is likely minimal within the energy-monitored property. The timestamp module 1483 may also be configured to identify a calibration open time and a calibration close time for the gas valve 1490 and/or the AC unit switch 1492 in accordance with the calibration schedule data 1432 during the first period of time. Moreover, a data module 1484 may be configured to receive actual energy usage data 1433 that occurred between the calibration open time and the calibration close time for the gas valve 1490 and/or the AC unit switch 1492 during the first period of time. The calibration open time and the calibration close time may differ from an operation open time and an operation close time because the calibration open and close times occur during calibration processes, whereas the operation open and close times occur during normal heating and cooling processes. A computational module 1485 may be configured to calculate a first computed flow rate for the gas valve 1490 and/or the AC unit switch 1492 based on the calibration open time, the calibration close time, and the actual energy usage data 1433 that occurred between the calibration open time and the calibration close time during the first period of time. For example, if the time period between the calibration open time and the calibration close time is three minutes and the actual energy usage that occurred during this time period is 0.3 Ccf, then the first computed flow rate for the gas valve 1490 may be (0.3 Ccf) (3 minutes)=0.1 Ccf per minute. A similar computed flow rate may be calculated for the AC unit switch 1492.

In this manner, the gas valve 1490 and the AC unit switch 1492 may be characterized by their individual first computed flow rates, which may be expressed in units of volume per time and/or current per time. Once the first computed flow rate for the gas valve 1490 and the AC unit switch 1492 are known, the estimated energy consumption for the gas valve 1490 and the AC unit switch 1492 may be continuously computed by the flow estimation module 1486. The flow estimation module 1486 may be configured to estimate energy consumption and provide an estimated energy usage data 1439 for the energy-monitored property based on the first computed flow rate for the gas valve 1490 and the AC unit switch 1492 and a total operational time for the gas valve 1490 and the AC unit switch 1492 over a selected time period of interest. For example, if the total operational time of the gas valve 1490 over a given time period of interest is 3.7 hours and the first computed flow rate for the valve is 0.1 Ccf per minute, then the energy consumption for the gas valve 1490 over the time period of interest is (3.7 hours=222 minutes)×(0.1 Ccf/minute)=22.2 Ccf. Likewise, the energy consumption for the AC unit switch 1492 may be computed in a similar manner.

In various embodiments, the first computed flow rate for the gas valve 1490 and the AC unit switch 1492 may be periodically updated or checked against a second computed flow rate for the gas valve 1490 and the AC unit switch 1492 to ensure accuracy of the first computed flow rates. In this embodiment, the calibration module 1482 may be configured to open and close the gas valve 1490 and the AC unit switch 1492 in accordance with the calibration schedule data 1432 during a second period of time when energy consumption is not likely to occur or is likely minimal within the energy-monitored property. The timestamp module 1483 may also be configured to identify a calibration open time and a calibration close time for the gas valve 1490 and the AC unit switch 1492 in accordance with the calibration schedule data 1432 during the second period of time. The data module 1484 may also be configured to receive actual energy usage data 1433 that occurred between the calibration open time and the calibration close time for the gas valve 1490 and the AC unit switch 1492 during the second period of time. The computational module 1485 may further be configured to calculate a second computed flow rate for the gas valve 1490 and the AC unit switch 1492 based on the calibration open time, the calibration close time, and the actual energy usage data 1433 that occurred between the calibration open time and the calibration close time during the second period of time.

Once the second computed flow rate for the gas valve 1490 and the AC unit switch 1492 are known, the calibration module 1482 may be configured to compare the first computed flow rate to the second computed flow rate for the gas valve 1490 and the AC unit switch 1492 and average the first computed flow rate with the second computed flow rate if the second computed flow rate is within a first percentage difference of the first computed flow rate. By way of example only, if the second computed flow rate is within 5% of the first computed flow rate, then the first computed flow rate may be averaged with the second computed flow rate. However, if the second computed flow rate is within a second percentage difference of the first computed flow rate (e.g., greater than 5%), then the calibration module 1482 may be configured to conduct further calibrations to try and determine which computed flow rate is accurate and/or which computed flow rate was affected by an anomaly that occurred during one of the two calibration sessions.

Figure 17A:
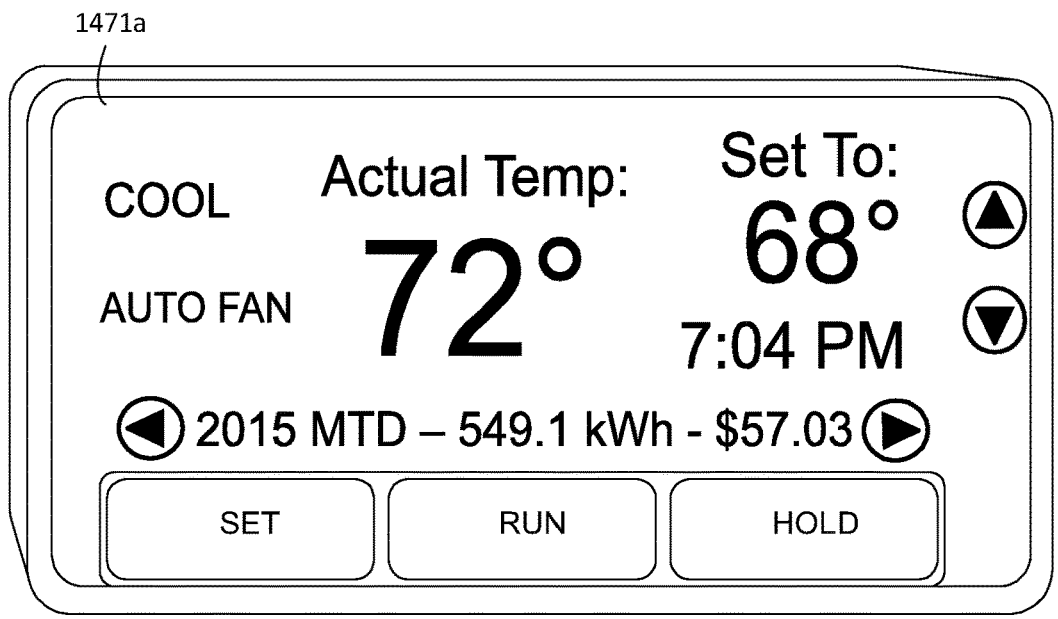
FIGS. 17A-18B illustrate various embodiments of a display screen for an HVAC controller.
Figure 17B:
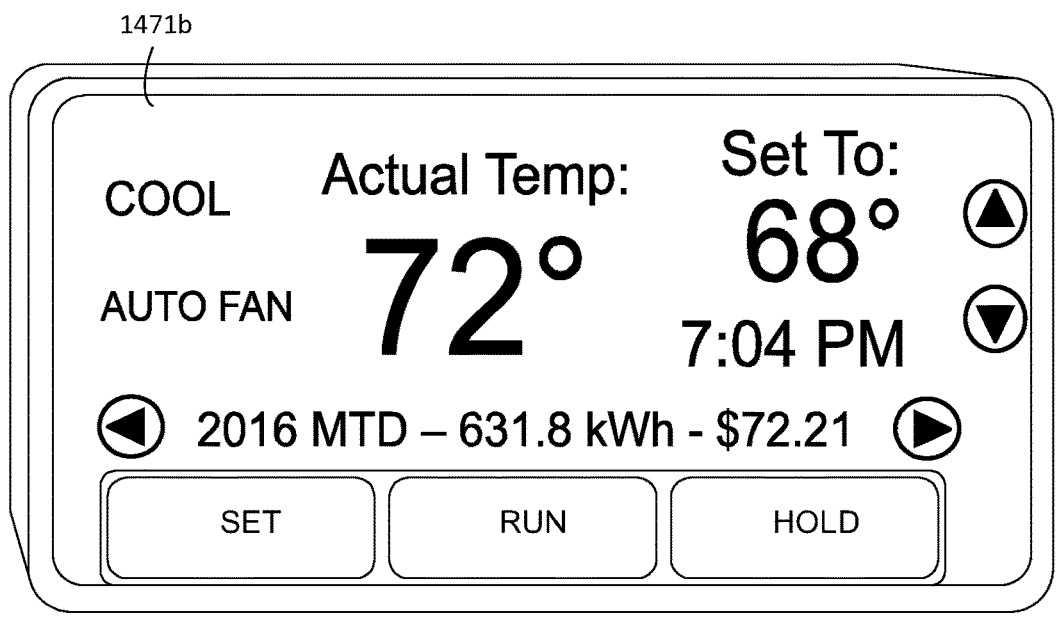
Figure 18A:
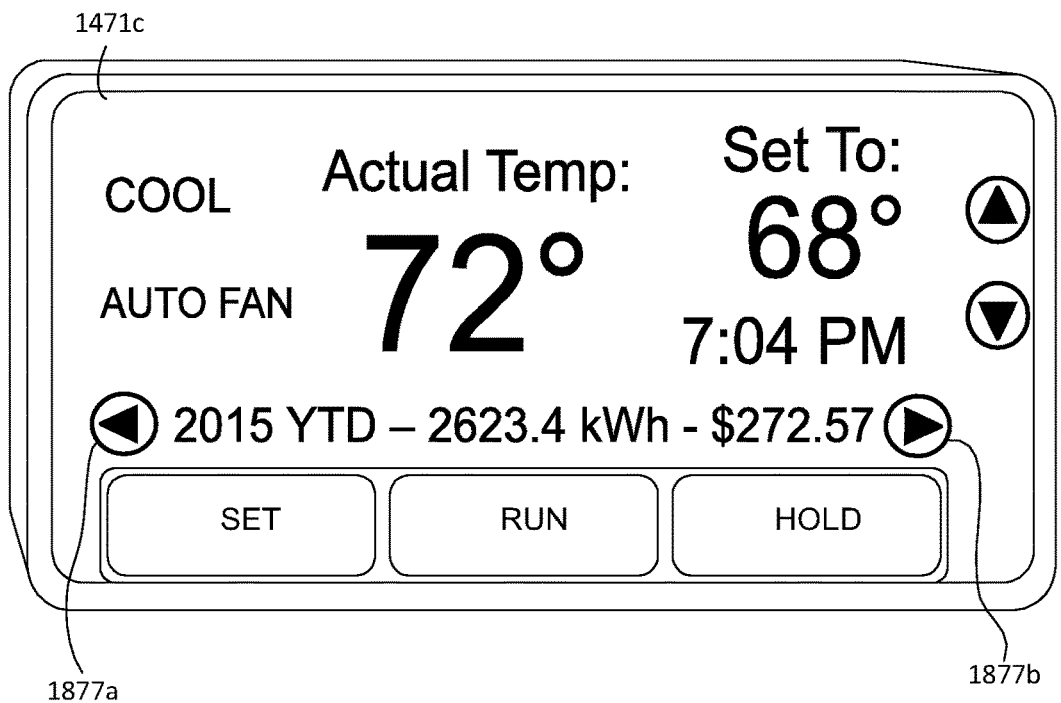
Figure 18B:
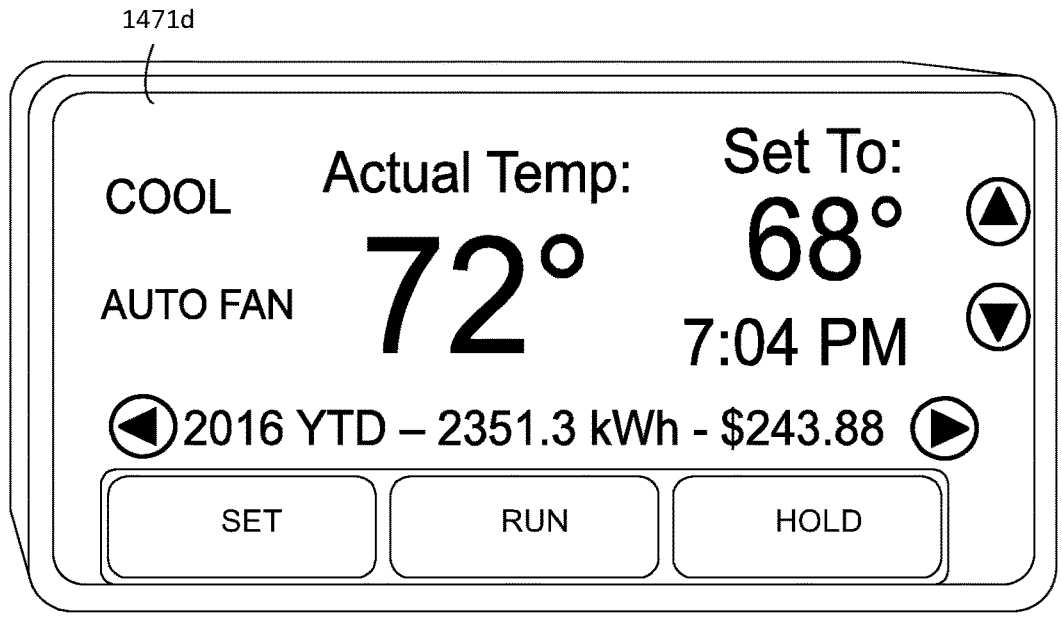

The display screen 1471 of the HVAC controller 1428 may be configured to display at least one of the estimated energy usage data 1439 in real time, the estimated energy usage data 1439 over a selected time period of interest, and/or a comparison between a first estimated energy usage data over a first selected time period of interest and a second estimated energy usage data over a second selected time period of interest. FIGS. 17A-18B illustrate various embodiments of display screens 1471*a-d* that may be used with the HVAC controller 1428 of the present disclosure. FIGS. 17A and 17B show an embodiment of a display screen 1471*a-b* displaying a message at the bottom of the display screen 1471*a-b* illustrating a comparison of electricity energy usage for a given month in different years (e.g., July 2015 electricity energy usage vs. July 2016 electricity energy usage). FIGS. 18A and 18B show an embodiment of a display screen 1471*c-d* illustrating a comparison of electricity energy usage between different years (e.g., electricity energy usage for 2015 vs. electricity energy usage for 2016). The user 110 may toggle through the information displayed on the bottom of the screen by pressing the left and right arrow keys 1877*a-b* on the bottom of the display to view various data such as the monthly energy consumption to date (and for past months), the yearly energy consumption to date (and for past years), the cost for energy consumption during different time periods, as well as other data described herein.

It will be understood that the foregoing sample display screen shots shown in FIGS. 17A-18B are merely examples and any number or variation of different display screen formats and/or display messages are contemplated herein.

Continuing, once again, with FIG. 14, the HVAC controller 1428 may further comprise historical data 1441. The historical data 1441 may comprise dates and times associated with energy flow data 1435, energy meter flow data 1434, HVAC energy consumption data 1436, and non-HVAC energy consumption data 1438. The historical data 1441 may be used for various purposes. For example, the historical data 1441 may be used by the detection module 1487 to determine when an anomaly has occurred, such as an energy leak, an excessive energy flow condition, an energy under-flow condition, an energy no-flow condition, and the like. For example, the anomaly could be due to a broken pipe, either upstream or downstream of the gas valve 1490. A broken pipe upstream of the gas valve 1490 may manifest by high gas usage both during and outside of operation of the gas valve 1490. A broken gas pipe downstream of the gas valve 1490 may be manifest by higher gas usage during operation of the gas valve 1490. Furthermore, an anomaly may involve lower gas usage. For example, if a homeowner turns off the heater for some reason and forgets to turn it back on this may create a low gas usage anomaly. Likewise, similar anomalies for electricity consumption are contemplated herein. The detection module 1487 may be configured to detect at least one energy consumption anomaly based on a comparison between the estimated energy usage data 1439 and the actual energy usage data 1433 over a selected time period of interest. The detection module 1487 may be further configured to generate a notification based on a specified threshold discrepancy between the estimated energy usage data 1439 and the actual energy usage data 1433 over the selected time period of interest. The detection module 1487 may determine whether a notification related to a detected anomaly should be generated by comparing historical data 1441 to current data. A significant jump or decline in the current data relative to the historical data 1441 could trigger various notifications depending on the nature of the anomaly detected. The appropriate anomaly notification may be transmitted to an end-user device 1426 for viewing by one or more users 110 in various ways, such as via the end-user device 1426, or the display screen 1471 of the HVAC controller 1428.

Figure 19A:
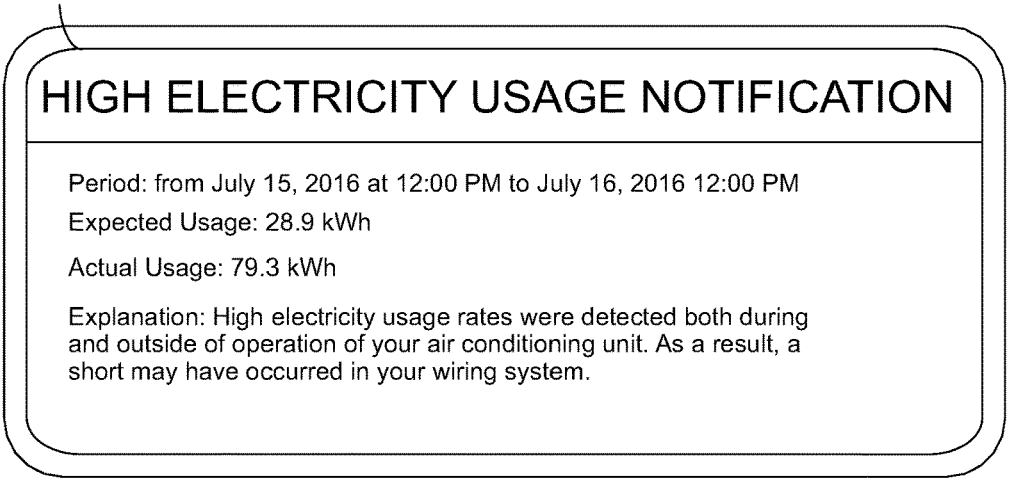
FIGS. 19A-C illustrate various embodiments of electricity usage notifications.
Figure 19B:
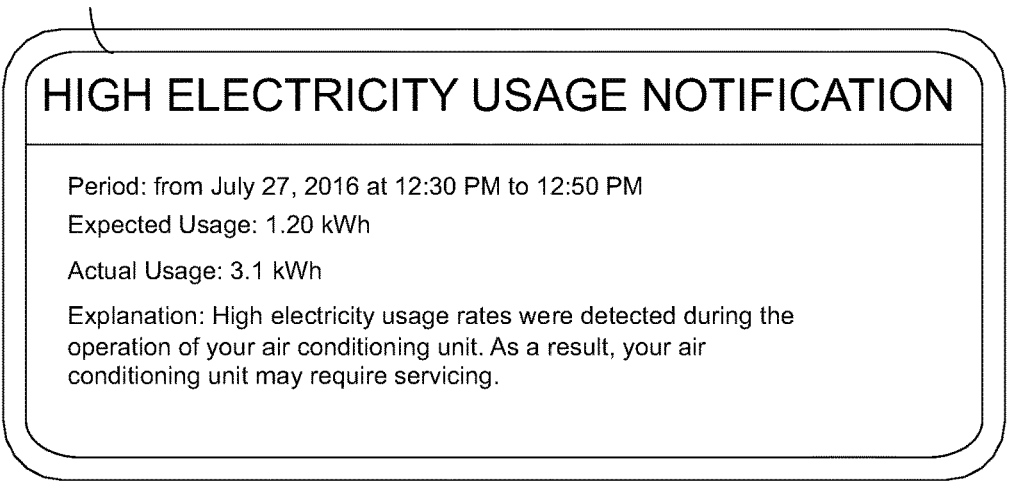
Figure 19C:
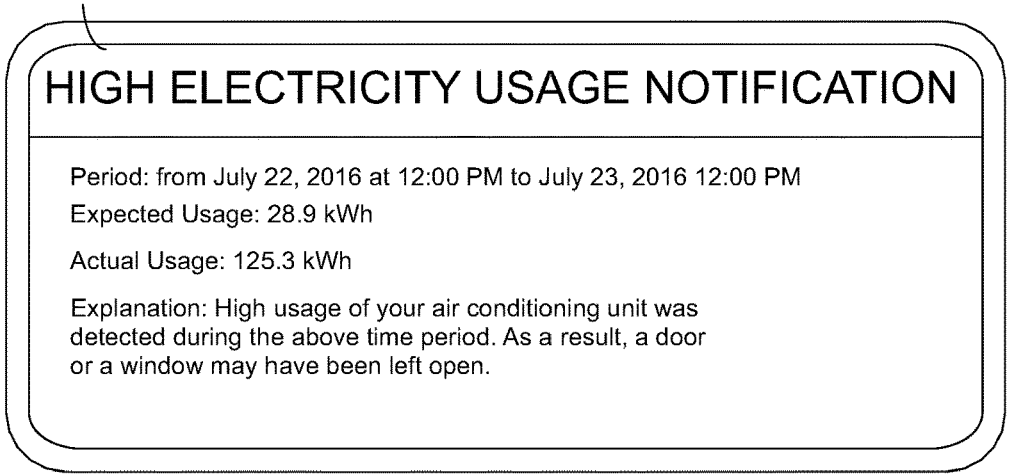
Figure 20A:
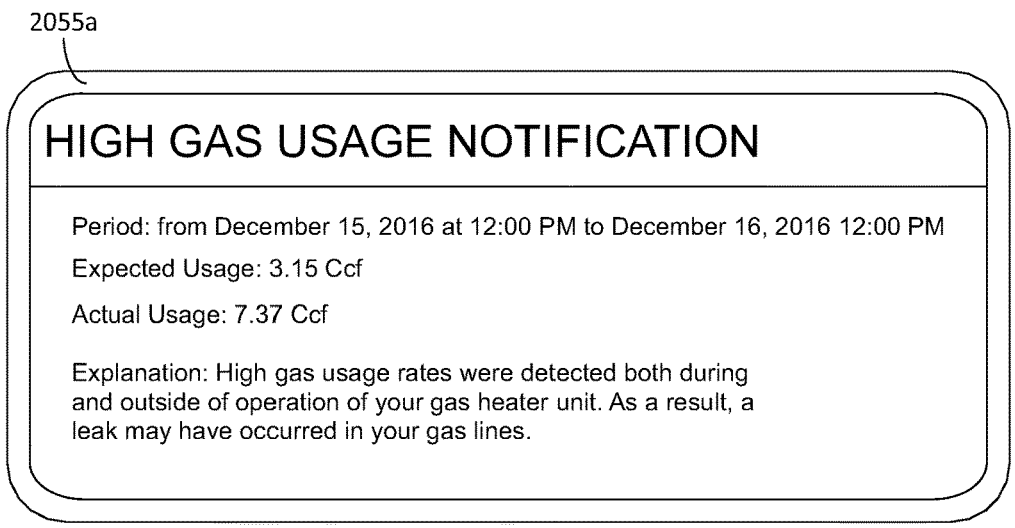
FIGS. 20A-C illustrate various embodiments of gas usage notifications.
Figure 20B:
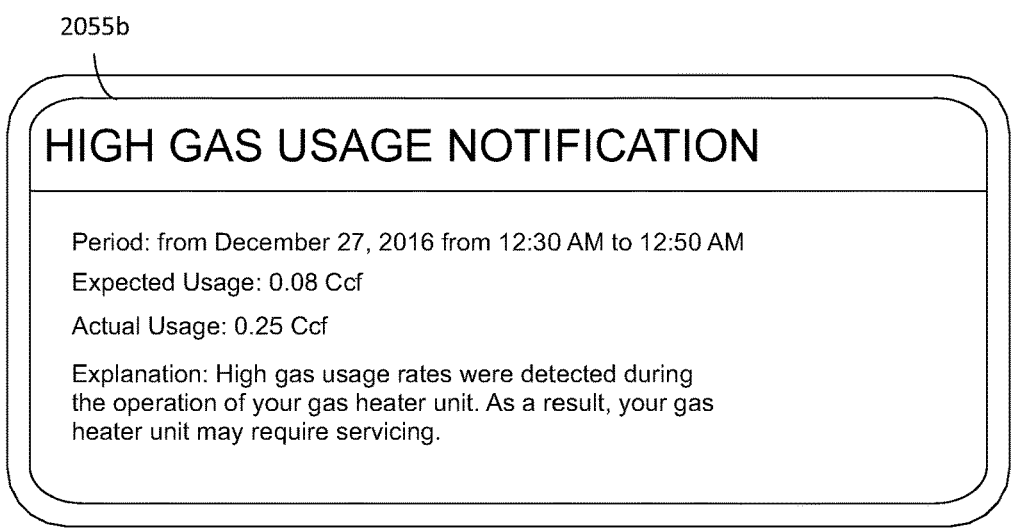
Figure 20C:
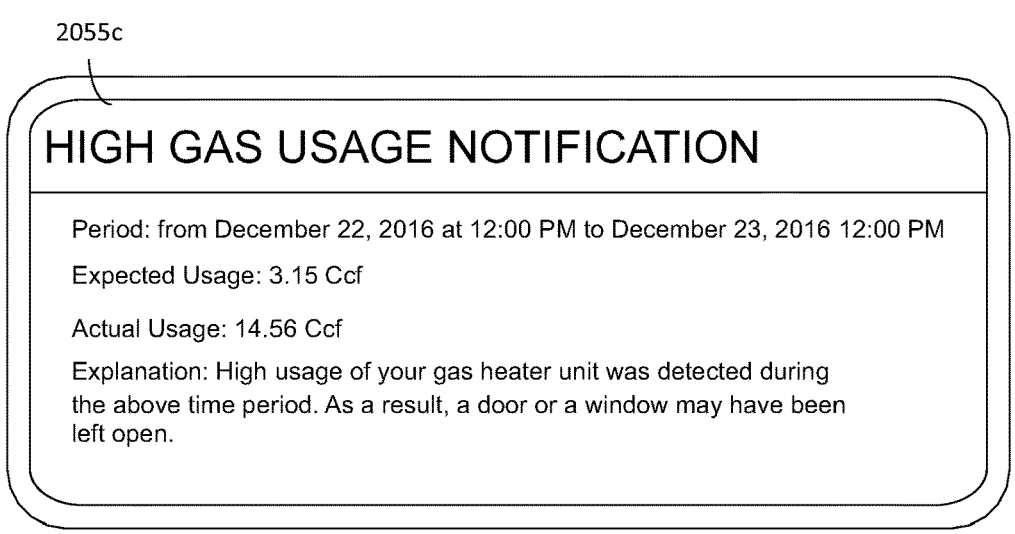

FIGS. 19A-20C illustrate various embodiments of electricity and gas usage notifications 1955*a-c*, 2055*a-c* that may be generated by the detection module 1487. FIG. 19A shows a notification 1955*a* indicating that an electrical short (an electrical leak) may have occurred in the wiring system associated with the air conditioning unit. FIG. 19B shows a notification 1955*b* indicating that high electricity usage was detected during operation of the air conditioning unit only, indicating that the air conditioning unit may require servicing. FIG. 19C shows a notification 1955*c* indicating that a door or a window may have been left open. FIG. 20A shows a notification 2055*a* indicating that a gas leak may have occurred in the gas line or lines. FIG. 20B shows a notification 2055*b* indicating that high gas usage was detected during operation of the heating unit, indicating that the heating unit may require servicing. FIG. 20C shows a notification 2055*c* that indicates that a door or a window may have been left open. It will be understood that the foregoing example notifications 1955*a-c*, 2055*a-c* shown in FIGS. 19A-20C are non-limiting and any number or variation of different notifications are contemplated herein.

Continuing with FIG. 14, the HVAC controller 1428 may also be coupled to a computer network 1440, such as the Internet and/or a local area network. The computer network 1440 may enable the HVAC controller 1428 to receive weather data 1443, such as temperature data, precipitation data, wind data, and the like from the weather station 1495. The received weather data 1443 may be stored in the data store 1430. The HVAC controller 1428 may also include a temperature sensor 1472 and the temperature data may also be calculated and received from the temperature sensor 1472 rather than, or in addition to, receiving the temperature data through the computer network 1440. The temperature sensor 1472, in one embodiment, may comprise an indoor and outdoor sensor with the indoor sensor sensing a temperature within the monitored structure (or within a portion of the monitored structure) and the outdoor sensor sensing the temperature outside the monitored structure. The weather data 1443 may be utilized to adjust the time period during which the gas valve 1490 and/or the AC unit switch 1492 may remain in an open or "on" state. For example, if the temperature data indicates that the conditions are generally cooler than an analogous period, indicating that an anomaly in energy consumption may be due to a temperature difference. The weather station 1495 could pertain to a particular user 110, area, residence, or business or could be utilized by a number of users 110. The weather station 1495 may further comprise a data storage facility for storing weather data 1443 for a variety of different physical locations and thus may comprise a server of some kind. The weather, such as humidity, may affect the performance and efficiency of a heating unit or an air conditioning unit and how different temperatures are perceived by individuals (e.g., causing the individuals to adjust the HVAC controller 1428 to a different temperature even though the outside temperatures may not have changed).

In various embodiments, the HVAC controller 1428 may also receive data (e.g., pulses) from the pulse detecting device 124 (illustrated in FIG. 4) to ascertain, for example, energy meter flow data 1434 for use in computing HVAC energy consumption data 1436 and non-HVAC energy consumption data 1438.

The computer network 1440 may also enable the HVAC controller 1428 to communicate with the first server 1452 and/or the end-user device 1426. Each of the components illustrated in the HVAC controller 1428 may be embodied or implemented within the first server 1452, the computing devices 120, and/or the end-user device 1426. In various embodiments, the end-user device 1426 is directly coupled through a wired or wireless connection to the first server 1452 rather than communicating with the first server 1452 through the computer network 1440. The end-user device 1426 may comprise, for example, a tablet, laptop, notebook, smartphone, or desktop computer, including associated software. The first server 1452 may comprise hardware and software (e.g., an operating system, volatile and non-volatile storage devices, a processor, and/or communication hardware).

Figure 15:
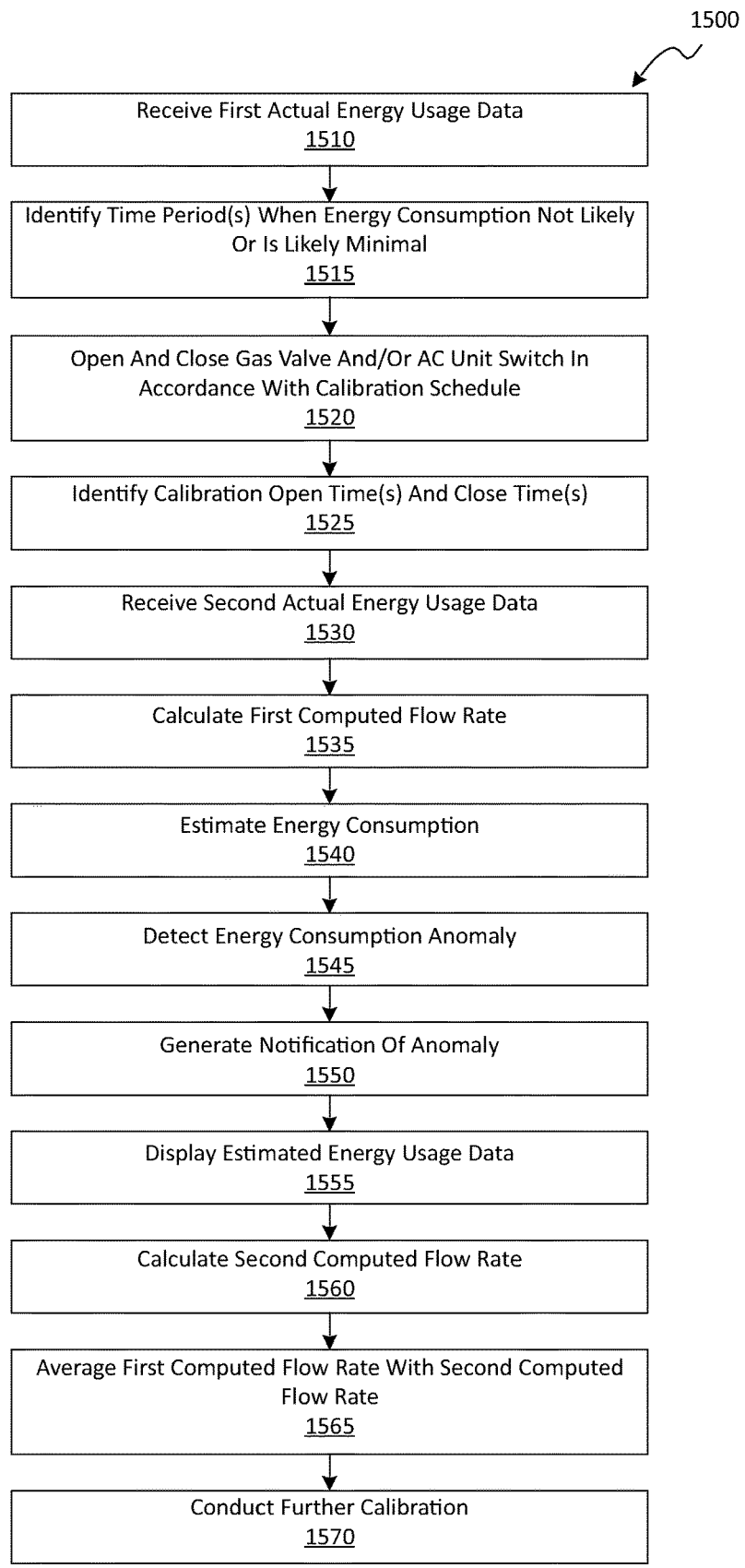
FIG. 15 is a flowchart illustrating one embodiment of a method for measuring HVAC energy consumption and performing other functions.

FIG. 15 illustrates a flowchart of one embodiment of a method 1500 for obtaining energy consumption data pertinent to an energy-monitored property. The method 1500 may be practiced with the system 1400 of FIG. 14. Similarly, the system 1400 may operate via the method 1500, or via other methods within the scope of the present disclosure.

As shown, the method 1500 may start with step 1510 in which the first actual energy usage data is received by the processor 210, for example, the processor 210 of the HVAC controller 1428 of FIG. 14, the processor 210 of the first server 1452 of FIG. 2B, and/or the processor of the end-user device 1426 or other computing devices described herein. The first actual energy usage data may be received from one or more energy utility entities or from one or more meters, as previously described.

In step 1515, one or more time periods in the first actual energy usage data may be identified by the processor 210 when energy consumption is not likely to occur or is likely minimal within the energy-monitored property.

In step 1520, the gas valve 1490 and/or the AC unit switch 1492 may be opened and closed in accordance with the calibration schedule data 1432 by the processor 210. The calibration schedule data 1432 may correspond to a first period of time when energy consumption is not likely to occur or is likely minimal within the energy-monitored property.

In step 1525, the calibration open time and the calibration close time for the gas valve 1490 and the AC unit switch 1492 may be identified by the processor 210 in accordance with the calibration schedule data 1432 for the first period of time.

In step 1530, the second actual energy usage data that occurred between the calibration open time and the calibration close time for the gas valve 1490 and the AC unit switch 1492 during the first period of time may be received by the processor 210. The second actual energy usage data may be received from one or more energy utility entities or from one or more meters, as previously described.

In step 1535, the first computed flow rate for the gas valve 1490 and the AC unit switch 1492 may be calculated by the processor 210 based on the calibration open time, the calibration close time, and the second actual energy usage data that occurred between the calibration open time and the calibration close time during the first period of time. This calculation may entail, for example, dividing the second actual energy usage by the amount of time between the calibration open time and the calibration close time for the gas valve 1490 and the AC unit switch 1492.

In step 1540, energy consumption may be estimated by the processor 210 by providing estimated energy usage data 1439 for the energy-monitored property based on the first computed flow rate for the gas valve 1490 and the AC unit switch 1492 and a total operational time for the gas valve 1490 and the AC unit switch 1492 over a selected time period of interest.

In step 1545, at least one energy consumption anomaly may be detected by the processor 210 based on a comparison between the estimated energy usage data 1439 and a third actual energy usage data over the selected time period of interest, as previously described.

In step 1550, a notification may be generated by the processor 210 based on a specified threshold discrepancy between the estimated energy usage data 1439 and a third actual energy usage data over the selected time period of interest.

In step 1555, the estimated energy usage data 1439 may be displayed for review by a user 110 on, for example, one or more of various end-user devices 1426. The estimated energy usage data 1439 may be displayed in various ways. By way of example, the estimated energy usage data 1439 is included in each of the sample energy usage notifications 1955*a-c* in FIGS. 19A-C as the "Expected Usage."

In step 1560, a second computed flow rate may be calculated by the processor 210 for the gas valve 1490 and the AC unit switch 1492. The second computed flow rate may be obtained in a similar manner to the first computed flow rate described above in steps 1520-1535. The second computed flow rate may be based on a calibration open time, a calibration close time, and a fourth actual energy usage data that occurred between the calibration open time and the calibration close time during a second period of time. This calculation may entail, for example, dividing the fourth actual energy usage by the amount of time between the calibration open time and the calibration close time.

In step 1565, the first computed flow rate may be compared to the second computed flow rate by the processor 210 and the first computed flow rate may be averaged with the second computed flow rate, if the second computed flow rate is within a first percentage difference of the first computed flow rate.

In step 1570, further calibration may be conducted if the second computed flow rate is within a second percentage difference of the first computed flow rate in order to determine which of the first and second flow rates are accurate, and/or which of the first and second flow rates was affected by an anomaly.

The method steps and/or actions of the method 1500 above may be interchanged with one another and one or more method steps and/or actions of method 1500 may not be performed by every embodiment disclosed herein.

It is understood that any specific order or hierarchy of steps in any disclosed process is merely illustrative. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Figure 21:
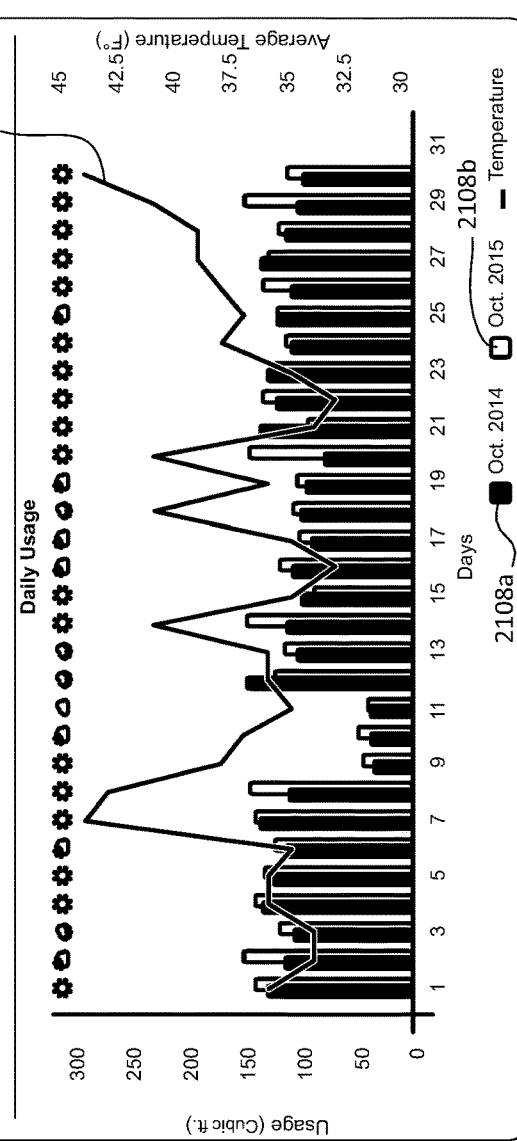
FIG. 21 illustrates one embodiment of a gas usage report.

FIG. 21 illustrates one embodiment of gas usage report 2100 that may be generated with data produced by embodiments of the present disclosure. The gas usage report 2100 shown in FIG. 21 may display data related to various items of interest including, but not limited to: monthly gas usage 2104, annual gas usage 2106, a comparison 2108 of annual usage of the identified gas-monitored property relative to the average of other gas-monitors properties in the same area, usage detail 2108*a-b* of October 2014 compared to October 2015 including temperature data 2120, anomaly detection/notifications 2116 and the like. The gas usage report X2100 shown in FIG. 21 may be displayed on any of the computing devices 120 or end-user devices 1426 disclosed herein and/or may be generated by the gas utility entity and sent directly to the user 110 in electronic and/or paper format. The report 2100 shown in FIG. 21 constitutes only one example of the type of reports that can be utilized generating the systems, mechanisms, and methods disclosed herein. A similar report could be generated for usage of electricity.

Systems and methods disclosed herein could be used in various locations, such as in conjunction with one or more businesses, residences, parks or broader geographical areas.

In addition, it should be noted that determining the flow rate or flow volume with a meter may be implemented in various ways. For example, a turbine at least partially disposed in a fluid or gas may be used to determine flow rate or flow volume of the fluid based on the number of rotations of the turbine. Alternatively, a diaphragm for sensing pressure may also be utilized. From the sensed pressure, a flow rate and/or flow volume may be derived based on the density of the fluid. Thus, a generated pulse may be embodied in various ways and may reference pressure, volume, flow rate or other types of data.

Reference throughout this specification to "an embodiment," "one embodiment" or "various embodiments" has reference to a particular feature, structure, mechanism or characteristic that may be included or used in connection with other features, structures mechanisms or characteristics disclosed herein and known to one of skill in the art at the time this application was filed. Thus, these phrases, or variations thereof, as recited throughout this specification are not necessarily all referring to the same embodiment.

Similarly, it will be appreciated that in the above description of embodiments, various features are sometimes grouped together in a single embodiment, figure, or description for the purpose of streamlining the present disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Only elements recited in means-plus-function format are intended to be construed in accordance with 35 U.S.C. § 112 Para. 6. It will be apparent to those having skill in the art that changes may be made to the details of the above-described embodiments without departing from the underlying principles of the present disclosure.

The description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed. For example, data collection vehicle 1620 of FIG. 16 may also be used in connection with the methods described in FIGS. 7 and 8 to collect actual water usage data. As an additional example, the of FIG. 14 and the method of FIG. 15 may also be used in connection with other gas or electrically powered appliances besides a heating unit or air conditioning unit, such as a gas-powered water heater or an electrical water heater. A gas-powered water heater may have anomalies in operation when a leak develops in the water holding tank of the heater (which may require increased operation of the water heater to maintain the water disposed therein at the set temperature). These anomalies may be detected and corresponding notifications may be provided using the methods and systems identified above.

It should also be noted that the first, second, third and fourth periods of time referenced herein, in various embodiments, may be mutually exclusive. In other words, in at least some embodiments, there is no temporal overlap between these periods of time.

It should also be noted, that in various embodiments, once the computed flow rate data 734 is established for irrigation zone(s) of a particular system, there is no requirement of a network connection at the water meter 310, hose-attached irrigation flow controller 330, 410 or multi- or single-zone irrigation flow controller 128, 628, 728 in order to calculate estimated water usage data 739. Instead, the computed flow rate data 734 may be utilized to calculate estimated water usage data 739 (e.g., gallons-per-minute for a particular zone multiplied by the number of minutes that the valve 690*a-c*, 790*a-c* associated with that zone is open for each zone). One benefit of a permanent connection to a network 640, 740 (or a readily available connection to a network 640, 740) is more rapid anomaly detection and faster generation of enhanced water reports (i.e., water usage reports based on ongoing actual water usage data 733). Without such a network connection, anomaly detection and enhanced reports will not be generated until the pertinent actual water usage data 733 is received or input into the flow controller 330, 410, 128, 628, 728, either by manually inputting the data at the flow controller 330, 410, 128, 628, 728 (e.g., using a numeric keypad or keyboard at the controller 330, 410, 128, 628, 728), inputting the data through a temporary or a sporadically available network connection (e.g., through a Wi-Fi connection made available by a cellular telephone), or through a portable storage device (e.g., a portable USB drive) coupled to the flow controller 330, 410, 128, 628, 728. It should also be noted that the computed flow rate data 734 may be calculated based on a user reading of before and after actual water usage data 733 from a water meter 310 in connection with a calibration cycle where actual water usage data 733 is displayed on the water meter 310 or is otherwise accessible to the user 110. Thus, in connection with calibration, the displayed values of the before and after actual water usage data 733 may be input into the irrigation flow controller 330, 410, 128, 628, 728 by the user 110 with the controller 330, 410, 128, 628, 728 realizing the appropriate computations of the computed flow rate 734 based on the time that the pertinent valve(s) 690*a-c*,790*a-c* were open and closed for each zone. The foregoing principles also apply to the system 1400, 1600 and methods 1500 outlined in connection with FIGS. 14-21 (i.e., estimated energy usage data 1439 based on the computed flow rate data 1442 may be calculated without a network connection, as indicated above).

The use of a hose-attached irrigation flow controller 330, 410 presents unusual challenges because the coupled hose-end products are not always static (i.e., the sprinklers attached to the hose-end product may be quickly and easily modified by a user 110, if desired). (It should also be noted that calibration should be repeated again when sprinkler heads coupled to a multi- or single-zone irrigation flow controller 128, 628, 728 are modified, added, or removed within one or more zones of a system.) Accordingly, the computed flow rate data 734 may change based on the coupled hose-end products. However, in situations where the hose-end products remain static, the computed flow rate data 734 would also remain constant in the absence of an anomaly, such as a broken sprinkler or a leak in the hose intermediate the hose-attached irrigation flow controller 330, 410 and the attached hose-end products.

What is claimed is:

1. A system configured to obtain irrigation water consumption data pertinent to a water-monitored property, the system comprising:

an irrigation valve interface configured to place the system in electronic communication with one or more irrigation valves, each of the one or more irrigation valves associated with watering a zone of the water-monitored property;

an irrigation valve controller configured to transmit electrical signals to the one or more irrigation valves to open and close the one or more irrigation valves in accordance with watering schedule data;

an identification module configured to, using one or more processors, identify, based on first actual water usage data for the water-monitored property, one or more daily, weekly, or monthly future time periods when water consumption is not likely to occur or is likely minimal within the water-monitored property;

a calibration module configured to open and close each of the one or more irrigation valves in accordance with calibration schedule data during a first period of time within the one or more daily, weekly, or monthly future time periods when water consumption is not likely to occur or is likely minimal within the water-monitored property;

a timestamp module configured to identify a calibration valve open time and a calibration valve close time for each of the one or more irrigation valves in accordance with the calibration schedule data during the first period of time;

a data module configured to receive second actual water usage data for usage that occurred between the calibration valve open time and the calibration valve close time for each of the one or more irrigation valves during the first period of time; and a computational module configured to calculate a first computed flow rate for each of the one or more irrigation valves based on the calibration valve open time, the calibration valve close time, and the second actual water usage data received for usage that occurred between the calibration valve open time and the calibration valve close time during the first period of time.

2. The system of claim 1, wherein the system comprises at least a server and an irrigation controller.

3. The system of claim 2, wherein the identification module, the data module and the computation module reside on the server.

4. The system of claim 1, further comprising:
a flow estimation module configured to estimate irrigation water consumption and provide estimated water usage data for at least one zone of the water-monitored property based on the first computed flow rate for each of the one or more irrigation valves associated with watering the at least one zone and a total operational time for each of the one or more irrigation valves associated with watering the at least one zone over a selected time period of interest.

5. The system of claim 4, further comprising:
a detection module configured to detect at least one water consumption anomaly based on a comparison between the estimated water usage data and third actual water usage data over the selected time period of interest, the detection module further configured to generate a notification based on a specified threshold discrepancy between the estimated water usage data and the third actual water usage data over the selected time period of interest.

6. The system of claim 4, further comprising:
a display screen configured to display at least one of the estimated water usage data in real time, a second estimated water usage data over a second selected time period of interest, and a comparison between a third estimated water usage data over a third selected time period of interest and a fourth estimated water usage data over a fourth selected time period of interest.

7. The system claim 4, wherein:
the calibration module is configured to open and close each of the one or more irrigation valves in accordance with the calibration schedule data during a second period of time within the one or more daily, weekly, or monthly future time periods when water consumption is not likely to occur or is likely minimal within the water-monitored property;
the timestamp module is configured to identify a calibration valve open time and a calibration valve close time for each of the one or more irrigation valves in accordance with the calibration schedule data during the second period of time;
the data module is configured to receive fourth actual water usage data for usage that occurred between the calibration valve open time and the calibration valve close time for each of the one or more irrigation valves during the second period of time;
the computational module is configured to calculate a second computed flow rate for each of the one or more irrigation valves based on the calibration valve open time, the calibration valve close time, and the fourth actual water usage data for usage that occurred between the calibration valve open time and the calibration valve close time during the second period of time; and
wherein the calibration module is configured to compare the first computed flow rate to the second computed flow rate and average the first computed flow rate with the second computed flow rate if the second computed flow rate is within a first percentage difference of the first computed flow rate and conduct further calibration if the second computed flow rate is within a second percentage difference of the first computed flow rate.

8. The system of claim 1, wherein the data module is further configured to receive the second actual water usage data from a water utility entity.

9. A method for obtaining irrigation water consumption data pertinent to a water-monitored property, the method comprising:
at one or more processors of a system that controls irrigation of the water-monitored property, receiving first actual water usage data for the water-monitored property, the system comprising:
an irrigation valve interface configured to place the system in electronic communication with one or more irrigation valves, each of the one or more irrigation valves associated with watering a zone of the water-monitored property; and
an irrigation valve controller configured to transmit electrical signals to the one or more irrigation valves to open and close the one or more irrigation valves in accordance with watering schedule data;
at the one or more processors of the system, identifying, based on the first actual water usage data, one or more daily, weekly, or monthly future time periods when water consumption is not likely to occur or is likely minimal within the water-monitored property;
opening and closing each of the one or more irrigation valves in accordance with calibration schedule data during a first period of time within the one or more daily, weekly, or monthly future time periods when water consumption is not likely to occur or is likely minimal within the water-monitored property;
at the one or more processors associated with the system, identifying a calibration valve open time and a calibration valve close time for each of the one or more irrigation valves in accordance with the calibration schedule data during the first period of time;
at the one or more processors of the system, receiving second actual water usage data for usage that occurred between the calibration valve open time and the calibration valve close time for each of the one or more irrigation valves during the first period of time; and
at the one or more processors of the system, calculating a first computed flow rate for each of the one or more irrigation valves based on the calibration valve open time, the calibration valve close time, and the second actual water usage data for usage that occurred between the calibration valve open time and the calibration valve close time during the first period of time.

10. The method of claim 9, wherein the system comprises at least a server and an irrigation controller.

11. The method of claim 10, wherein identifying, based on the first actual water usage data, the one or more daily, weekly, or monthly future time periods when water consumption is not likely to occur or is likely minimal within the water-monitored property is performed on the server.

12. The method of claim 9, further comprising:
at the one or more processors associated with the system, estimating irrigation water consumption by providing estimated water usage data for at least one zone of the water-monitored property based on the first computed flow rate for each of the one or more irrigation valves associated with watering the at least one zone and a total operational time for each of the one or more irrigation valves associated with watering the at least one zone over a selected time period of interest.

13. The method of claim 12, further comprising:
at the one or more processors of the system, detecting at least one water consumption anomaly based on a comparison between the estimated water usage data and a third actual water usage data over the selected time period of interest; and
at the one or more processors of the system, initiating generation of a notification based on a specified threshold discrepancy between the estimated water usage data and the third actual water usage data over the selected time period of interest.

14. The method of claim 12, wherein the system comprises a display screen, the method further comprising:
at the display screen, displaying at least one of the estimated water usage data in real time, a second estimated water usage data over a second selected time period of interest, and a comparison between a third estimated water usage data over a third selected time period of interest and a fourth estimated water usage data over a fourth selected time period of interest.

15. A computer program product for obtaining irrigation water consumption data pertinent to a water-monitored property, the computer program product comprising:
a non-transitory computer readable medium; and
computer program code, encoded on the non-transitory computer readable medium, configured to cause at least one processor to perform the steps of:
causing a system that controls irrigation of the water-monitored property to receive first actual water usage data for the water-monitored property, the system comprising:
an irrigation valve interface configured to place the system in electronic communication with one or more irrigation valves, each of the one or more irrigation valves associated with watering a zone of the water-monitored property; and
an irrigation valve controller configured to transmit electrical signals to the one or more irrigation valves to open and close the one or more irrigation valves in accordance with watering schedule data;
identifying, based on the first actual water usage data, one or more daily, weekly, or monthly future time periods when water consumption is not likely to occur or is likely minimal within the water-monitored property;
opening and closing each of the one or more irrigation valves in accordance with calibration schedule data during a first period of time within the one or more daily, weekly, or monthly future time periods when water consumption is not likely to occur or is likely minimal within the water-monitored property;
identifying a calibration valve open time and a calibration valve close time for each of the one or more irrigation valves in accordance with the calibration schedule data during the first period of time;
receiving second actual water usage data for usage that occurred between the calibration valve open time and the calibration valve close time for each of the one or more irrigation valves during the first period of time; and calculating a first computed flow rate for each of the one or more irrigation valves based on the calibration valve open time, the calibration valve close time, and the second actual water usage data for usage that occurred between the calibration valve open time and the calibration valve close time during the first period of time.

16. The computer program product of claim 15, wherein the system comprises at least a server and an irrigation controller.

17. The computer program product of claim 16, wherein identifying, based on the first actual water usage data, the one or more daily, weekly, or monthly future time periods when water consumption is not likely to occur or is likely minimal within the water-monitored property is performed on the server.

18. The computer program product of claim 15, wherein the computer program code is further configured to cause the at least one processor to perform the step of:
estimating irrigation water consumption by providing estimated water usage data for at least one zone of the water-monitored property based on the first computed flow rate for each of the one or more irrigation valves associated with watering the at least one zone and a total operational time for each of the one or more irrigation valves associated with watering the at least one zone over a selected time period of interest.

19. The computer program product of claim 18, wherein the computer program code is further configured to cause the at least one processor to perform the steps of:
detecting at least one water consumption anomaly based on a comparison between the estimated water usage data and a third actual water usage data over the selected time period of interest; and
generating a notification based on a specified threshold discrepancy between the estimated water usage data and the third actual water usage data over the selected time period of interest.

20. The computer program product of claim 16, wherein the system comprises a display screen, wherein the computer program code is further configured to cause the at least one processor to cause the display screen to display at least one of estimated water usage data in real time, a second estimated water usage data over a second selected time period of interest, and a comparison between a third estimated water usage data over a third selected time period of interest and a fourth estimated water usage data over a fourth selected time period of interest.

* * * * *

UNITED STATES PATENT AND TRADEMARK OFFICE
CERTIFICATE OF CORRECTION

PATENT NO. : 11,281,240 B1
APPLICATION NO. : 16/685804
DATED : March 22, 2022
INVENTOR(S) : Eyring et al.

It is certified that error appears in the above-identified patent and that said Letters Patent is hereby corrected as shown below:

In the Claims

Column 37, Line 29: Delete "7. The system claim 4, wherein:" and Insert --7. The system of claim 4, wherein:--

Signed and Sealed this
Twenty-fourth Day of May, 2022

Katherine Kelly Vidal
*Director of the United States Patent and Trademark Office*